US012532346B2

(12) United States Patent
Landis et al.

(10) Patent No.: US 12,532,346 B2
(45) Date of Patent: Jan. 20, 2026

(54) MUTUAL INFORMATION BASED CONTROL CHANNEL CANDIDATE PRUNING

(71) Applicant: QUALCOMM Incorporated, San Diego, CA (US)

(72) Inventors: Shay Landis, Hod Hasharon (IL); Ran Berliner, kfar Aviv (IL); Peer Berger, Hod Hasharon (IL); Yevgeny Zagalsky, Karmey Yosef (IL); Eitan Yerushalmi, Tel Aviv (IL); David Jacobian, Herzliya (IL)

(73) Assignee: QUALCOMM Incorporated, San Diego, CA (US)

( * ) Notice: Subject to any disclaimer, the term of this patent is extended or adjusted under 35 U.S.C. 154(b) by 357 days.

(21) Appl. No.: 18/299,574

(22) Filed: Apr. 12, 2023

(65) Prior Publication Data

US 2024/0349323 A1     Oct. 17, 2024

(51) Int. Cl.
*H04W 72/23*     (2023.01)
*H04L 25/02*     (2006.01)
*H04W 72/542*     (2023.01)

(52) U.S. Cl.
CPC ....... *H04W 72/542* (2023.01); *H04L 25/0224* (2013.01); *H04W 72/23* (2023.01)

(58) Field of Classification Search
CPC ......... H04W 72/0473; H04W 72/0446; H04W 72/542; H04W 72/23; H04W 52/365; H04W 72/047; H04L 25/0224; H04L 25/0226; H04L 25/022
See application file for complete search history.

(56) References Cited

U.S. PATENT DOCUMENTS

| | | | |
|---|---|---|---|
| 2013/0294318 A1* | 11/2013 | Amerga | H04W 4/06 370/312 |
| 2018/0083733 A1 | 3/2018 | Chen et al. | |
| 2018/0279327 A1 | 9/2018 | Ying et al. | |
| 2019/0253986 A1* | 8/2019 | Jeon | H04L 5/0048 |
| 2024/0421957 A1* | 12/2024 | Koskela | H04L 5/0094 |

FOREIGN PATENT DOCUMENTS

KR     20220103610 A     7/2022

OTHER PUBLICATIONS

International Search Report and Written Opinion—PCT/US2024/020283—ISA/EPO—Jul. 3, 2024.

* cited by examiner

*Primary Examiner* — Wei Zhao
(74) *Attorney, Agent, or Firm* — Loza & Loza, LLP

(57) ABSTRACT

Aspects relate to mechanisms for mutual information (MI)-based physical downlink control channel (PDCCH) candidate pruning. A UE may receive a plurality of PDCCH candidates in a search space. Each of the PDCCH candidates includes a demodulation reference signal (DMRS) generated with the same scrambling seed and control information generated with one or more respective UE-specific non-transparent precoding parameters. The UE can prune the PDCCH candidates to identify at least one PDCCH candidate for decoding by generating the log-likelihood ratio (LLR) magnitudes of demodulated PDCCH candidates and calculating the mutual information based on the LLR magnitudes.

28 Claims, 14 Drawing Sheets

MUTUAL INFORMATION BASED CONTROL CHANNEL CANDIDATE PRUNING

TECHNICAL FIELD

The technology discussed below relates generally to wireless communication systems, and more particularly, to physical downlink control channel (PDCCH) candidate pruning for PDCCH candidates having common demodulation reference signal (DMRS) scrambling seeds.

INTRODUCTION

Wireless communication systems, such as those specified under fourth generation, referred to as Long Term Evolution (LTE) or LTE-Advanced (LTE-A), fifth generation (5G) systems, referred to as New Radio (NR) systems, and sixth generation (6G) systems, control information may be transmitted from a network entity (e.g., an aggregated or disaggregated base station) to a user equipment (UE) in a control channel (CCH), such as a physical downlink control channel (PDCCH). The control information may include common control information applicable to a number of UEs or UE-specific control information applicable to a single UE.

Each PDCCH may be formed of a number of resources corresponding to a PDCCH format or PDCCH aggregation level and may further be scrambled with a radio network temporary identifier (RNTI), which may be a common/group RNTI for common control information or a UE-specific RNTI for UE-specific control information. Decoding of PDCCHs is based on blind decoding of multiple PDCCH candidates in a slot. To limit the number of blind decodes, UE-specific search spaces (USSs) and common search spaces (CSSs) may be defined for a UE. The UE may then perform blind decoding over all aggregation levels and corresponding USSs or CSSs to determine whether at least one PDCCH exists for the UE.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, an apparatus for wireless communication at a user equipment (UE) is disclosed. The apparatus includes a memory and a processor coupled to the memory. The processor can be configured to receive, from a network entity, a plurality of physical downlink control channel (PDCCH) candidates. Each of the plurality of PDCCH candidates can include a respective demodulation reference signal (DMRS) and respective control information. Each of the respective DMRSs may be generated based on a scrambling seed common to a plurality of UEs including the UE in a search space and each of the respective control information may be generated based on a respective non-transparent precoding parameter associated with a respective UE of the plurality of UEs. The processor can further be configured to demodulate the plurality of PDCCH candidates to produce a plurality of demodulated PDCCH candidates, generate log-likelihood ratio (LLR) magnitudes for each of the plurality of demodulated PDCCH candidates, calculate mutual information for each of the plurality of demodulated PDCCH candidates based on the LLR magnitudes, and prune the plurality of demodulated PDCCH candidates based on the mutual information to identify at least one demodulated PDCCH candidate of the plurality of demodulated PDCCH candidates for decoding.

Another example provides a method operable at a user equipment (UE). The method includes receiving, from a network entity, a plurality of physical downlink control channel (PDCCH) candidates. Each of the plurality of PDCCH candidates includes a respective demodulation reference signal (DMRS) and respective control information. Each of the respective DMRSs may be generated based on a scrambling seed common to a plurality of UEs including the UE in a search space and each of the respective control information may be generated based on a respective non-transparent precoding parameter associated with a respective UE of the plurality of UEs. The method further includes demodulating the plurality of PDCCH candidates to produce a plurality of demodulated PDCCH candidates, generating log-likelihood ratio (LLR) magnitudes for each of the plurality of demodulated PDCCH candidates, calculating mutual information for each of the plurality of demodulated PDCCH candidates based on the LLR magnitudes, and pruning the plurality of demodulated PDCCH candidates based on the mutual information to identify at least one demodulated PDCCH candidate of the plurality of demodulated PDCCH candidates for decoding.

Another example provides an apparatus for wireless communication at a network entity. The apparatus includes a memory and a processor coupled to the memory. The processor can be configured to generate a plurality of physical downlink control channels (PDCCHs). Each of the plurality of PDCCHs can include a respective demodulation reference signal (DMRS) and respective control information. Each of the respective DMRSs may be generated based on a scrambling seed common to a plurality of UEs in a search space and each of the respective control information may be generated based on a respective non-transparent precoding parameter associated with a respective UE of the plurality of UEs. The processor can further be configured to provide the plurality of PDCCHs in the search space to at least one of the plurality of UEs.

Another example provides a method operable at a network entity. The method includes generating a plurality of physical downlink control channels (PDCCHs). Each of the plurality of PDCCHs includes a respective demodulation reference signal (DMRS) and respective control information. Each of the respective DMRSs may be generated based on a scrambling seed common to a plurality of UEs in a search space and each of the respective control information may be generated based on a respective non-transparent precoding parameter associated with a respective UE of the plurality of UEs. The method further includes providing the plurality of PDCCHs in the search space to at least one of the plurality of UEs.

These and other aspects will become more fully understood upon a review of the detailed description, which follows. Other aspects, features, and examples will become apparent to those of ordinary skill in the art upon reviewing the following description of specific exemplary aspects in conjunction with the accompanying figures. While features may be discussed relative to certain examples and figures below, all examples can include one or more of the features discussed herein. In other words, while one or more examples may be discussed as having certain features, one or more of such features may also be used in accordance with the various examples discussed herein. Similarly, while examples may be discussed below as device, system, or method examples, it should be understood that such examples can be implemented in various devices, systems, and methods.

DETAILED DESCRIPTION

Figure 1:
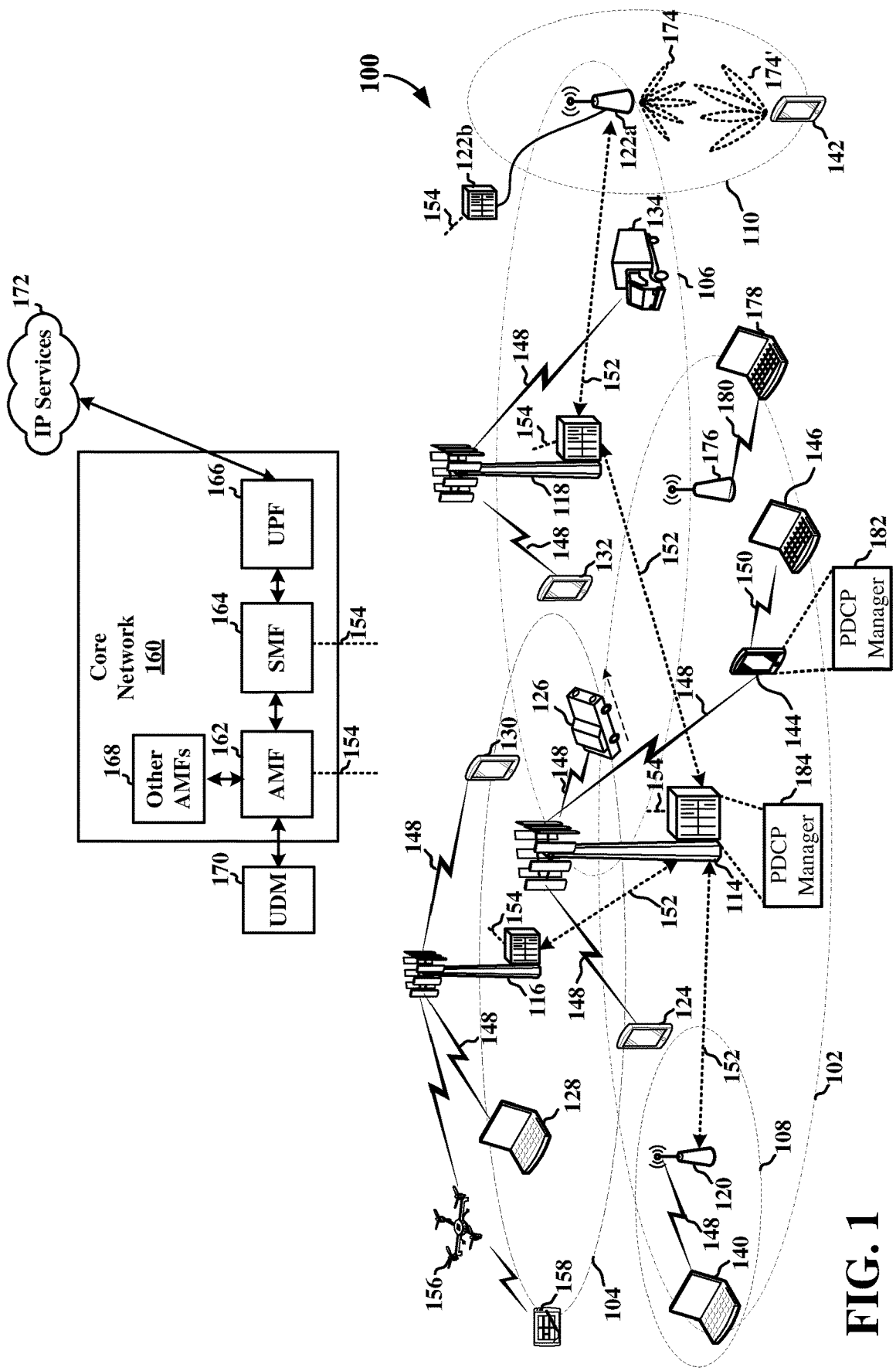
FIG. 1 is a diagram illustrating an example of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component-based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for the implementation and practice of claimed and described examples. For example, transmission and reception of wireless signals necessarily includes a number of components for analog and digital purposes (e.g., hardware components including antenna, radio frequency (RF) chains (RF-chains), power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., network entity and/or UE), end-user devices, etc., of varying sizes, shapes, and constitution.

To decode a physical downlink control channel (PDCCH) intended for a UE, the UE performs blind decoding for a set of PDCCH candidates within one or more search spaces. However, monitoring a large number of PDCCH candidates or search spaces increases the UE complexity. In addition, blind decoders typically consume a significant amount of power and may also impact the end-to-end receive time.

Various aspects are related to mechanisms for mutual information (MI)-based CCH candidate pruning in a search space (e.g., a common search space or a UE-specific search space) in which the same demodulation reference signal (DMRS) scrambling seed is used for a plurality of UEs. To distinguish between the PDCCHs carrying respective control information and DMRSs generated based on the same scrambling seed, the downlink control information (DCI) in each PDCCH may be generated using a UE-specific non-transparent precoding parameter. The non-transparent precoding parameter may be configured for the UE as part of a search space configuration (e.g., via a radio resource control (RRC) configuration of the search space for the UE). Examples of non-transparent precoding parameters may include, but are not limited to, rotation, cyclic shift, and/or precoder (e.g., which may be based on a precoder table).

A UE may demodulate a plurality of PDCCH candidates, generate log-likelihood ratio (LLR) magnitudes for each of the demodulated PDCCH candidates based on the non-transparent precoding parameters, and calculate the mutual information (MI) for each of the PDCCH candidates based on the LLRs. The UE may then compare the MI for each of the PDCCH candidates to a threshold and prune the PDCCH candidates whole MI is less than the threshold (e.g., PDCCH candidates that were not generated with the non-transparent precoding parameter associated with the UE, and as such, are not intended for the UE). By pruning the PDCCH candidates using the MI for the PDCCH candidates, the number of PDCCH candidates that need to be decoded is reduced, thus saving power, reducing the complexity of the UE, and reducing the end-to-end receive time.

The various concepts presented throughout this disclosure may be implemented across a broad variety of telecommunication systems, network architectures, and communication standards. Referring now to FIG. 1, as an illustrative example without limitation, a schematic illustration of a wireless communication network including a radio access network (RAN) 100 and a core network 160 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. In other examples, the RAN 100 may operate according to a hybrid of 5G NR and 6G, may operate according to 6G, or may operate according to other future radio access technology (RAT). Of course, many other examples may be utilized within the scope of the present disclosure.

The geographic region covered by the RAN 100 may be divided into a number of cellular regions (cells) that can be uniquely identified by a user equipment (UE) based on an identification broadcasted over a geographical area from one access point or network entity. FIG. 1 illustrates cells 102, 104, 106, 108, and 110 each of which may include one or more sectors (not shown). A sector is a sub-area of a cell. All sectors within one cell are served by the same network entity. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective network entity serves each cell. Broadly, a network entity is responsible for radio transmission and reception in one or more cells to or from a UE. A network entity may also be referred to by those skilled in the art as a base station (e.g., an aggregated base station or disaggregated base station), base transceiver station (BTS), a radio base station, a radio transceiver, a transceiver function, a basic service set (BSS), an extended service set (ESS), an access point (AP), a Node B (NB), an evolved NB (eNB), a 5G NB (gNB), a transmission receive point (TRP), or some other suitable terminology. In some examples, a network entity may include two or more TRPs that may be collocated or non-collocated. Each TRP may communicate on the same or different carrier frequency within the same or different frequency band. In examples where the RAN 100 operates according to both the LTE and 5G NR standards, one of the network entities may be an LTE network entity, while another network entity may be a 5G NR network entity.

In some examples, the RAN 100 may employ an open RAN (O-RAN) to provide a standardization of radio interfaces to procure interoperability between component radio equipment. For example, in an O-RAN, the RAN may be disaggregated into a centralized unit (CU), a distributed unit (DU), and a radio unit (RU). The RU is configured to transmit and/or receive (RF) signals to and/or from one or more UEs. The RU may be located at, near, or integrated with, an antenna. The DU and the CU provide computational functions and may facilitate the transmission of digitized radio signals within the RAN 100. In some examples, the DU may be physically located at or near the RU. In some examples, the CU may be located near the core network 160.

The DU provides downlink and uplink baseband processing, a supply system synchronization clock, signal processing, and an interface with the CU. The RU provides downlink baseband signal conversion to an RF signal, and uplink RF signal conversion to a baseband signal. The O-RAN may include an open fronthaul (FH) interface between the DU and the RU. Aspects of the disclosure may be applicable to an aggregated RAN and/or to a disaggregated RAN (e.g., an O-RAN).

Various network entity arrangements can be utilized. For example, in FIG. 1, network entities 114, 116, and 118 are shown in cells 102, 104, and 106; and another network entity 122 is shown controlling a remote radio head (RRH) 122 in cell 110. That is, a network entity can have an integrated antenna or can be connected to an antenna or RRH by feeder cables. In the illustrated example, the cells 102, 104, 106, and 110 may be referred to as macrocells, as the network entities 114, 116, 118, and 122 support cells having a large size. Further, a network entity 120 is shown in the cell 108 which may overlap with one or more macrocells. In this example, the cell 108 may be referred to as a small cell (e.g., a microcell, picocell, femtocell, home base station, home Node B, home eNode B, etc.), as the network entity 120 supports a cell having a relatively small size. Cell sizing can be done according to system design as well as component constraints.

It is to be understood that the RAN 100 may include any number of network entities and cells. Further, a relay node may be deployed to extend the size or coverage area of a given cell. In some examples, a cell may not necessarily be stationary, and the geographic area of the cell may move according to the location of a mobile network entity.

FIG. 1 further includes an unmanned aerial vehicle (UAV) 156, which may be a drone or quadcopter. The UAV 156 may be configured to function as a network entity, or more specifically as a mobile network entity. That is, in some examples, a cell may not necessarily be stationary, and the geographic area of the cell may move according to the location of a mobile network entity such as the UAV 156.

In addition to other functions, the network entities 114, 116, 118, 120, and 122a/122b may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The network entities 114, 116, 118, 120, and 122a/122b may communicate directly or indirectly (e.g., through the core network 170) with each other over backhaul links 152 (e.g., X2 interface). The backhaul links 152 may be wired or wireless.

The RAN 100 is illustrated supporting wireless communication for multiple mobile apparatuses. A mobile apparatus is commonly referred to as user equipment (UE) in standards and specifications promulgated by the $3^{rd}$ Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 124, 126, and 144 may be in communication with network entity 114; UEs 128 and 130 may be in communication with network entity 116; UEs 132 and 138 may be in communication with network entity 118; UE 140 may be in communication with network entity 120; UE 142 may be in communication with network entity 122*a* via RRH 122*b*; and UE 158 may be in communication with mobile network entity 156. Here, each network entity 114, 116, 118, 120, 122*a*/122*b*, and 156 may be configured to provide an access point to the core network 170 (not shown) for all the UEs in the respective cells. In another example, a mobile network node (e.g., UAV 156) may be configured to function as a UE. For example, the UAV 156 may operate within cell 104 by communicating with network entity 116. UEs may be located anywhere within a serving cell. UEs that are located closer to a center of a cell (e.g., UE 132) may be referred to as cell center UEs, whereas UEs that are located closer to an edge of a cell (e.g., UE 134) may be referred to as cell edge UEs. Cell center UEs may have a higher signal quality (e.g., a higher reference signal received power (RSRP) or signal-to interference-plus-noise ratio (SINR)) than cell edge UEs.

In the RAN 100, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In some examples, during a call facilitated by a network entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE May undertake a handoff or handover from the serving cell to the neighboring (target) cell. For example, UE 126 may move from the geographic area corresponding to its serving cell 102 to the geographic area corresponding to a neighbor cell 106. When the signal strength or quality from the neighbor cell 106 exceeds that of its serving cell 102 for a given amount of time, the UE 126 may transmit a reporting message to its serving network entity 114 indicating this condition. In response, the UE 126 may receive a handover command, and the UE may undergo a handover to the cell 106.

Wireless communication between a RAN 100 and a UE (e.g., UE 124, 126, or 144) may be described as utilizing communication links 148 over an air interface. Transmissions over the communication links 148 between the network entities and the UEs may include uplink (UL) (also referred to as reverse link) transmissions from a UE to a network entity and/or downlink (DL) (also referred to as forward link) transmissions from a network entity to a UE. For example, DL transmissions may include unicast or broadcast transmissions of control information and/or data (e.g., user data traffic or other type of traffic) from a network entity (e.g., network entity 114) to one or more UEs (e.g., UEs 124, 126, and 144), while UL transmissions may include transmissions of control information and/or traffic information originating at a UE (e.g., UE 124). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

The communication links 148 may use multiple-input and multiple-output (MIMO) antenna technology, including spatial multiplexing, beamforming, and/or transmit diversity. For example, as shown in FIG. 1, network entity 122*a*/122*b* may transmit a beamformed signal to the UE 142 via one or more beams 174 in one or more transmit directions. The UE 142 may further receive the beamformed signal from the network entity 122*a*/122*b* via one or more beams 174' in one or more receive directions. The UE 142 may also transmit a beamformed signal to the network entity 122*a*/122*b* via the one or more beams 174' in one or more transmit directions. The network entity 122a/122b may further receive the beamformed signal from the UE 142 via the one or more beams 174 in one or more receive directions. The network entity 122a/122b and the UE 142 may perform beam training to determine the best transmit and receive beams 174/174' for communication between the network entity 122a/122b and the UE 142. The transmit and receive beams for the network entity 122a/122b may or may not be the same. The transmit and receive directions for the UE 142 may or may not be the same.

The communication links 148 may utilize one or more carriers. The network entities and UEs may use spectrum up to Y MHZ (e.g., 5, 10, 15, 20, 100, 400, etc. MHZ) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The communication links 148 in the RAN 100 may further utilize one or more multiplexing and multiple access algorithms to enable simultaneous communication of the various devices. For example, 5G NR specifications provide multiple access for UL or reverse link transmissions from UEs 124, 126, and 144 to network entity 114, and for multiplexing DL or forward link transmissions from the network entity 114 to UEs 124, 126, and 144 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the network entity 114 to UEs 124, 126, and 144 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the communication links 148 in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex (FD).

In various implementations, the communication links 148 in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHZ-7.125 GHZ) and FR2 (24.25 GHZ-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4-a or FR4-1 (52.6 GHZ-71 GHZ), FR4 (52.6 GHZ-114.25 GHZ), and FR5 (114.25 GHZ-300 GHZ). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In some examples, access to the air interface may be scheduled, wherein a scheduling entity (e.g., a network entity 114) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs (e.g., UE 124), which may be scheduled entities, may utilize resources allocated by the scheduling entity 114.

Network entities are not the only entities that may function as scheduling entities. That is, in some examples, a UE may function as a scheduling entity, scheduling resources for one or more scheduled entities (e.g., one or more other UEs). For example, two or more UEs (e.g., UEs 144 and 146) may communicate with each other using peer to peer (P2P) or sidelink signals via a sidelink 150 therebetween without relaying that communication through a network entity (e.g., network entity 114). In some examples, the UEs 144 and 146 may each function as a scheduling entity or transmitting sidelink device and/or a scheduled entity or a receiving sidelink device to communicate sidelink signals therebetween without relying on scheduling or control information from a network entity (e.g., network entity 114). In other examples, the network entity 114 may allocate resources to the UEs 144 and 146 for sidelink communication. For example, the UEs 144 and 146 may communicate using sidelink signaling in a P2P network, a device-to-device (D2D) network, vehicle-to-vehicle (V2V) network, a vehicle-to-everything (V2X), a mesh network, or other suitable network.

In some examples, a D2D relay framework may be included within a cellular network to facilitate relaying of communication to/from the network entity 114 via D2D links (e.g., sidelink 150). For example, one or more UEs (e.g., UE 144) within the coverage area of the network entity 114 may operate as a relaying UE to extend the coverage of the network entity 114, improve the transmission reliability to one or more UEs (e.g., UE 146), and/or to allow the network entity to recover from a failed UE link due to, for example, blockage or fading.

The wireless communications system may further include a Wi-Fi access point (AP) 176 in communication with Wi-Fi stations (STAs) 178 via communication links 180 in a 5 GHz unlicensed frequency spectrum. When communicating in an unlicensed frequency spectrum, the STAs 170/AP 176 may perform a clear channel assessment (CCA) prior to communicating in order to determine whether the channel is available.

The network entities 114, 116, 118, 120, and 122a/122b provide wireless access points to the core network 160 for any number of UEs or other mobile apparatuses via core network backhaul links 154. The core network backhaul links 154 may provide a connection between the network entities 114, 116, 118, 120, and 122a/122b and the core network 170. In some examples, the core network backhaul links 154 may include backhaul links 152 that provide interconnection between the respective network entities. The core network may be part of the wireless communication system and may be independent of the radio access technology used in the RAN 100. Various types of backhaul interfaces may be employed, such as a direct physical connection (wired or wireless), a virtual network, or the like using any suitable transport network.

The core network 160 may include an Access and Mobility Management Function (AMF) 162, other AMFs 168, a Session Management Function (SMF) 164, and a User Plane Function (UPF) 166. The AMF 162 may be in communication with a Unified Data Management (UDM) 170. The AMF 162 is the control node that processes the signaling between the UEs and the core network 160. Generally, the AMF 162 provides QoS flow and session management. All user Internet protocol (IP) packets are transferred through the UPF 166. The UPF 166 provides UE IP address allocation as well as other functions. The UPF 166 is configured to couple to IP Services 172. The IP Services 172 may include the Internet, an intranet, an IP Multimedia Subsystem (IMS), a PS Streaming Service, and/or other IP services.

NR 5G wireless communication systems may support one or more frequency ranges, including FR1, FR2 or a legacy LTE frequency range. For example, the LTE frequency range may include the E-UTRA frequency bands between 350 MHZ and 3.8 GHz. In some examples, each cell may support a single frequency range (e.g., FR1, FR2 or legacy LTE) and may further support one or more frequency bands (e.g., carrier frequencies) within a particular frequency range. In addition, one or more cells may operate as anchor cells enabling dual connectivity with neighbor cell(s) supporting a different frequency range. In some examples, one or more cells may be NR dual connectivity (NR DC) cells that support dual connectivity between FR1 and FR2 (e.g., FR1+FR2 DC). For example, a NR DC anchor cell may be configured for communication with UEs in the cell over FR1, and may further support dual connectivity by the UEs to enable simultaneous communication over FR1 with the NR DC anchor cell and over FR2 with one or more neighbor NR cells. In other examples, one or more cells may be Evolved-Universal Terrestrial Radio Access New Radio dual connectivity (EN-DC) that support dual connectivity between an LTE frequency band and either FR1 or FR2, as described in more detail below in connection with FIG. 5. For example, an LTE anchor cell may be configured for communication with UEs in the cell over an LTE frequency band, and may further support dual connectivity by the UEs to enable simultaneous communication over the LTE frequency band with the LTE anchor cell and over either FR1 or FR2 with one or more neighbor NR cells.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB (gNB), access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2:
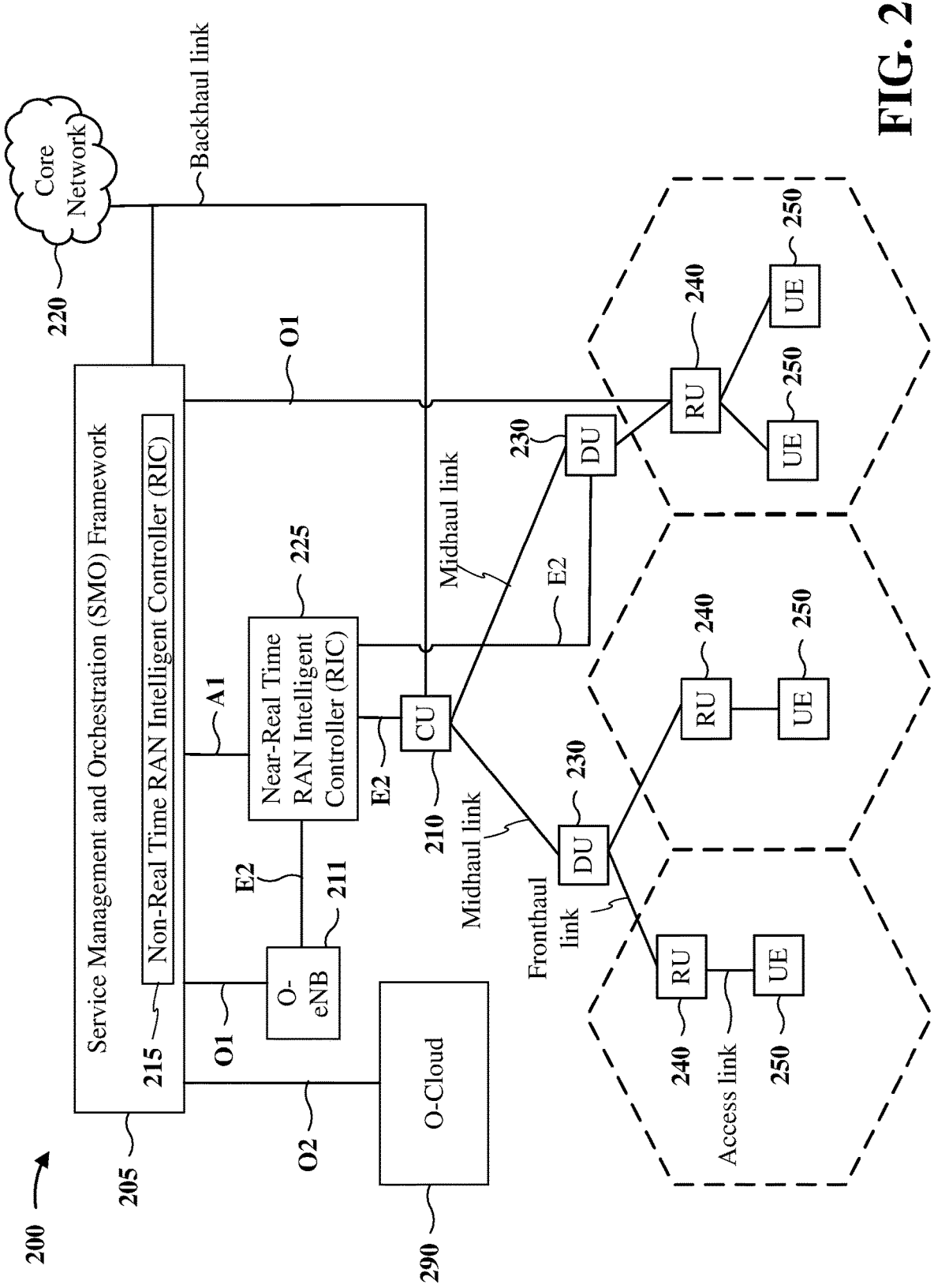
FIG. 2 is a diagram providing a high-level illustration of one example of a configuration of a disaggregated base station according to some aspects.

FIG. 2 shows a diagram illustrating an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 250 via one or more radio frequency (RF) access links. In some implementations, the UE 250 may be simultaneously served by multiple RUs 240.

Each of the units, i.e., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 250. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 5G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
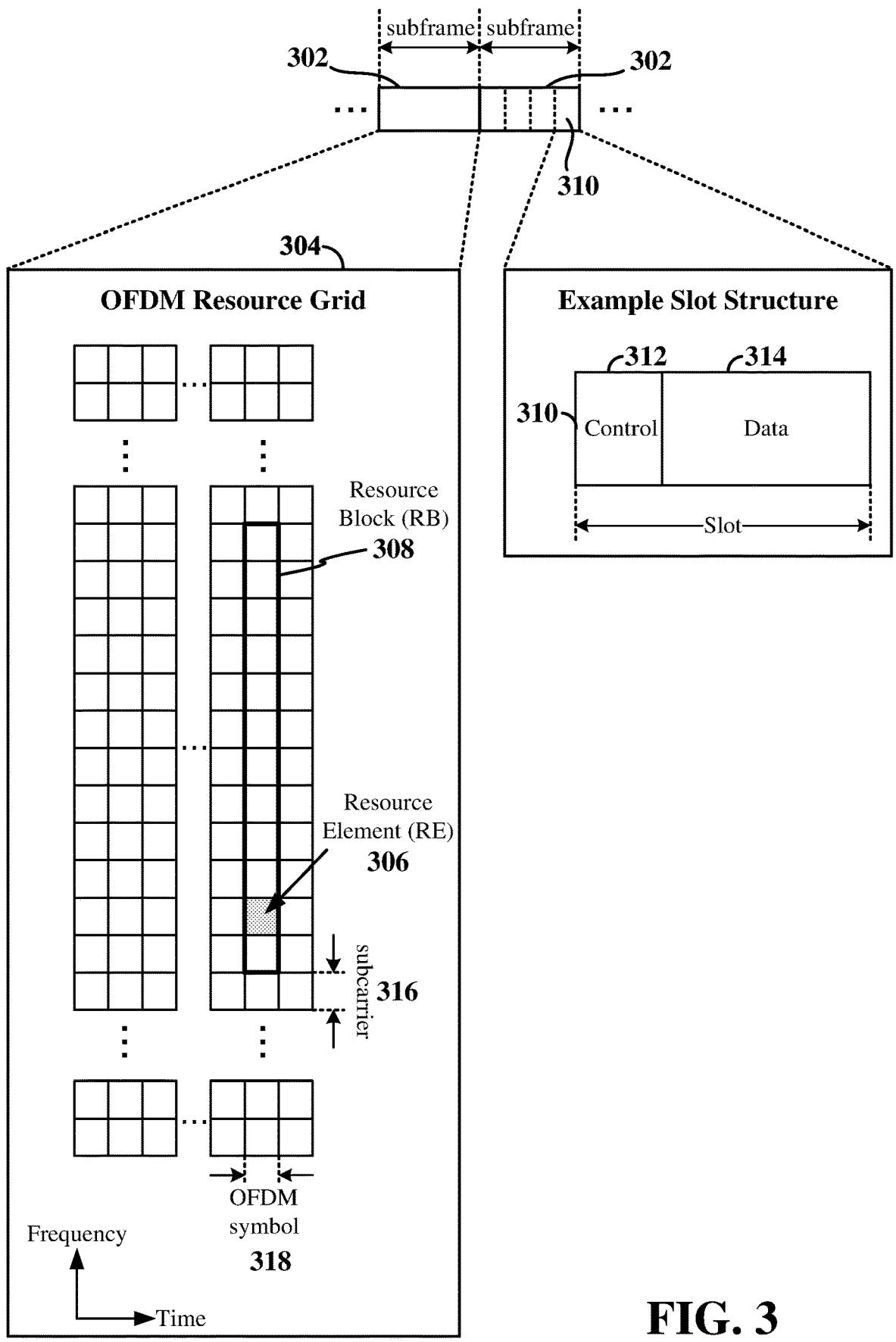
FIG. 3 is a schematic illustration of an organization of wireless resources in an air interface utilizing orthogonal frequency divisional multiplexing (OFDM) according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a network entity (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a network entity, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a network entity) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgement (ACK) or negative acknowledgement (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The network entity may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A network entity may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a proximity service (ProSc) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Figure 4:
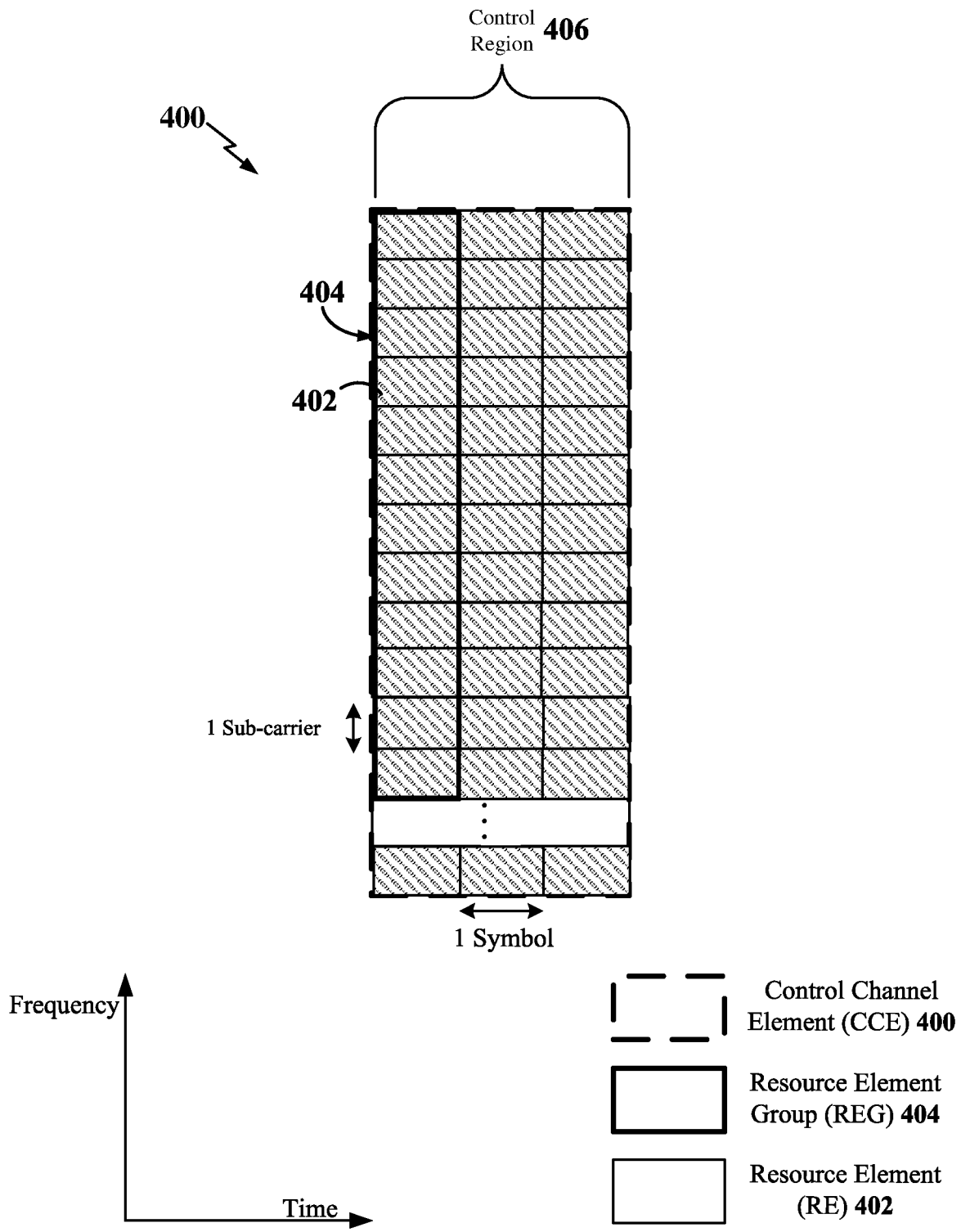
FIG. 4 is a schematic illustration of an example control channel element (CCE) structure according to some aspects.

FIG. 4 is a schematic illustration of an example control channel element (CCE) 400 structure in a DL control portion 406 of a slot according to some aspects. The slot may correspond, for example, to the slot illustrated in FIG. 3. The CCE 400 structure of FIG. 4 represents a portion of the DL control portion 406, including a number of REs 402 that may be grouped into REGs 404. Each REG 404 generally may contain, for example, twelve consecutive REs 402 (or nine REs 402 and three DMRS REs) within the same OFDM symbol and the same RB. In this example, the CCE structure 400 includes at least six REGs 404 distributed across three OFDM symbols. However, as those skilled in the art will readily appreciate, the CCE 400 structure for any particular application may vary from the example described herein, depending on any number of factors. For example, the CCE 400 structure may contain any suitable number of REGs.

In some examples, the PDCCH may be constructed from a variable number of CCEs, depending on the PDCCH format (or aggregation level). Each PDCCH format (or aggregation level) supports a different DCI length. In some examples, PDCCH aggregation levels of 1, 2, 4, 8, and 16 may be supported, corresponding to 1, 2, 4, 8, or 16 contiguous CCEs, respectively. Scheduling a PDCCH for a specific UE is performed by scrambling the CCHs cyclic redundancy check (CRC) with the UE-specific RNTI. For PDCCHs carrying common DCI, the CCHs CRC may be scrambled with a common/group RNTI.

Since the UE is unaware of the particular aggregation level of the PDCCH or whether multiple PDCCHs may exist for the UE in the slot, the UE may perform blind decoding of various PDCCH candidates within the first N control OFDM symbols (as indicated by the slot format of the slot) based on an expected RNTI (e.g., UE-specific RNTI or common/group RNTI). Each PDCCH candidate includes a collection of one or more consecutive CCEs based on an assumed DCI length (e.g., PDCCH aggregation level).

To limit the number of blind decodes, search spaces defining UE-specific search spaces (USSs) and common search spaces (CSSs) may be defined. The search space sets (e.g., USSs and CSSs) configured for a UE limit the number of blind decodes that the UE performs for each PDCCH format combination. The starting point (offset or index) of a UE-specific search space may be different for each UE and each UE may have multiple UE-specific search spaces (e.g., one for each aggregation level). The common search space sets consist of CCEs used for sending control information that is common to a group of UEs or to all UEs. Thus, the common search space sets are monitored by multiple UEs in a cell. The starting point (offset or index) of a search space set for group common control information may be the same for all UEs in the group and there may be multiple search space sets defined for group common control information (e.g., one for each configured aggregation level for the group of UEs). The UE may perform blind decoding over all aggregation levels and corresponding USSs or CSSs to determine whether at least one valid DCI exists for the UE.

Figure 5:
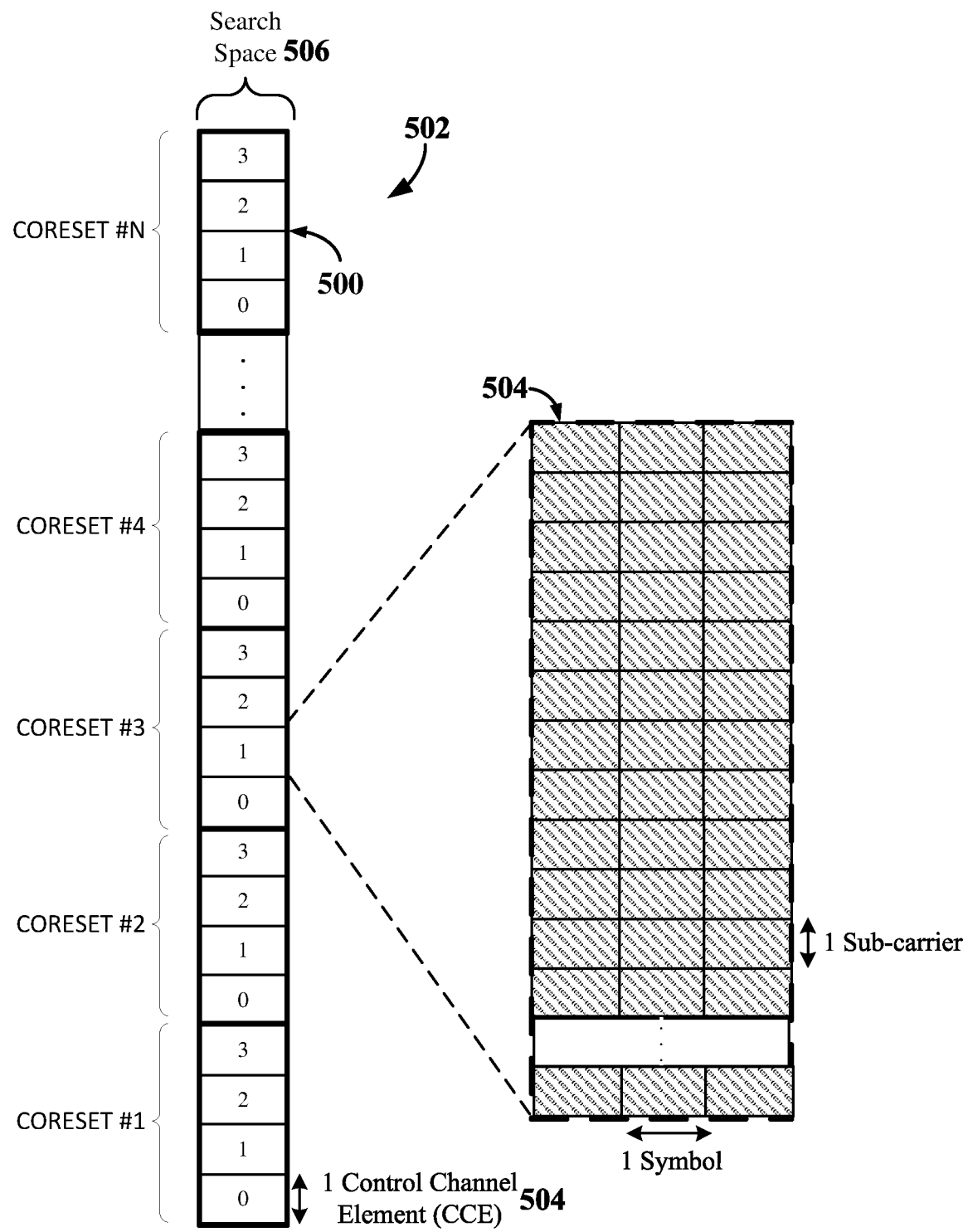
FIG. 5 is a schematic illustration of a control resource set (CORESET) according to some aspects.

FIG. 5 is a schematic illustration of an example of a CORESET 500 of a DL control portion 502 of a slot according to some aspects. The DL control portion 502 may correspond, for example, to the DL control portion illustrated in FIG. 3. A CORESET 500 may be configured for group common control information or UE-specific control information and may be used for transmission of a PDCCH including the group common control information or UE-specific control information to a set of one or more UEs. The UE may monitor one or more CORESETs 500 that the UE is configured to monitor for the UE-specific or group common control information.

Each CORESET 500 represents a portion of the DL control portion 502 including a number of sub-carriers in the frequency domain and one or more symbols in the time domain. In the example of FIG. 5, each CORESET 500 includes at least one CCE 504 having dimensions in both frequency and time, sized to span across at least three OFDM symbols. A CORESET having a size that spans across two or more OFDM symbols may be beneficial for use over a relatively small system bandwidth (e.g., 5 MHZ). However, a one-symbol CORESET may also be possible.

A plurality of CORESETs 500 indexed as CORESET #1-CORESET #N are shown as occurring during three OFDM symbols in the time domain and occupying a first region of frequency resources in the frequency domain of the DL control portion 502. In the example shown in FIG. 5, each CORESET 500 includes four CCEs 504. It should be noted that this is just one example. In another example, each CORESET 500 may include any suitable number of CCEs 504. The number of CCEs 504 and configuration of CCEs 504 for each CORESET 500 may be dependent, for example, on the aggregation level applied to the PDCCH.

As described above, a search space for a UE is indicated by a set of contiguous CCEs that the UE should monitor for downlink assignments and uplink grants relating to a particular component carrier for the UE. In the example shown in FIG. 5, the plurality of CORESETs 500 may form a search space 506, which may be a USS or a CSS. Within a USS, the aggregation level of a PDCCH may be, for example, 1, 2, 4, or 8 consecutive CCEs and within a CSS, the aggregation level of the PDCCH may be, for example 4 or 8 consecutive CCEs. In addition, the number of PDCCH candidates within each search space may vary depending on the aggregation level utilized. For example, for a USS with an aggregation level of 1 or 2, the number of PDCCH candidates may be 6. In this example, the number of CCEs in the USS search space 506 for an aggregation level of 1 may be 6, and the number of CCEs in the USS search space 506 for an aggregation level of 2 may be 12. However, for a USS with an aggregation level of 4 or 8, the number of PDCCH candidates may be 2. In this example, the number of CCEs in the USS search space 506 for an aggregation level of 4 may be 8, and the number of CCEs in the USS search space 506 for an aggregation level of 8 may be 16. For a CSS search space 506, the number of CCEs in the search space 506 may be 16 regardless of the aggregation level.

Figure 6:
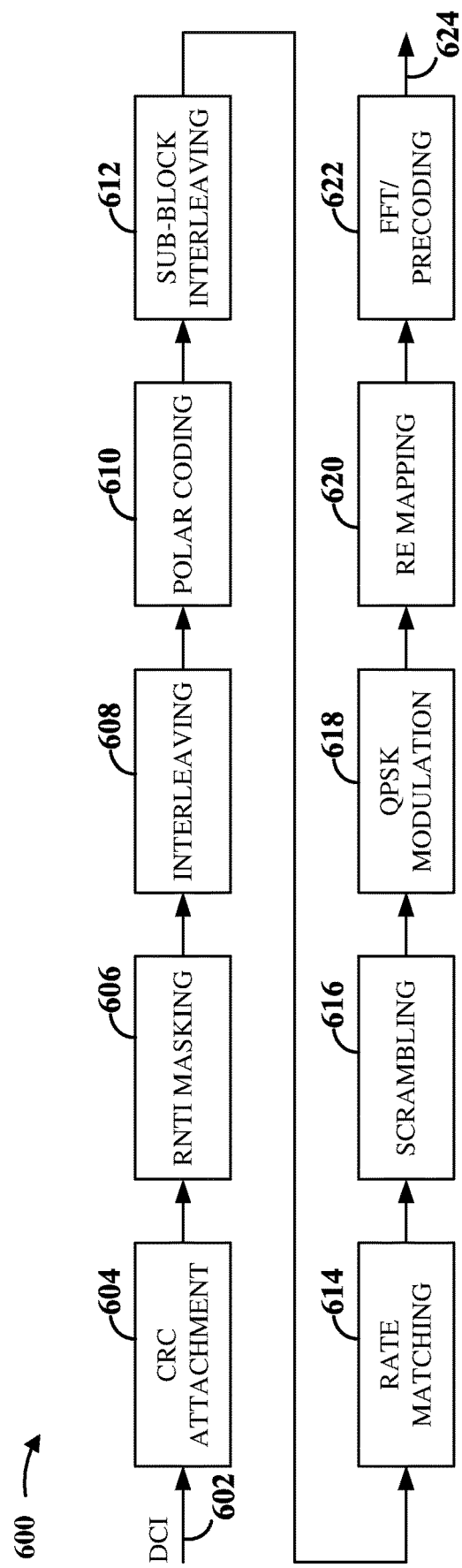
FIG. 6 is a diagram illustrating an example of PDCCH generation circuitry according to some aspects.

FIG. 6 is a diagram illustrating an example of PDCCH generation circuitry 600 (e.g., within a network entity) according to some aspects. The PDCCH generation circuitry 600 may include, for example, CRC attachment circuitry 604, RNTI masking circuitry 606, interleaving circuitry 608, polar coding circuitry 610, sub-block interleaving circuitry 612, rate matching circuitry 614, scrambling circuitry 616, QPSK modulation circuitry 618, resource element (RE) mapping circuitry 620, and precoding circuitry 622. The CRC attachment circuitry 604 is configured to receive DCI 602 carrying scheduling information and/or other control information for one UE or a group of UEs. The CRC attachment circuitry 604 can calculate a 24-bit CRC based on the DCI payload bits and append the CRC to the DCI payload. The RNTI masking circuitry 606 may then be configured to mask the last 16 CRC bits with the corresponding RNTI (e.g., UE-specific RNTI or group/common RNTI). Thus, the last 16 CRC bits may be XOR'ed with a 16-bit RNTI to enable the UE to detect the DCI intended for the UE. For example, for a unicast PDCCH transmission, a specific UE may be configured with a unique CRC bit mask (e.g., UE specific cell RNTI (C-RNTI)), whereas for broadcast/multicast PDCCH transmission, multiple UEs may use the same CRC bit mask (e.g., system information RNTI (SI-RNTI) or paging RNTI (P-RNTI)).

The interleaving circuitry 608 can then interleave the CRC attached bits to distribute the CRC bits throughout the control information (data) bits. The bits may then be encoded by the polar coding circuitry 610. The output of the polar coding circuitry 610 may be processed using the sub-block interleaving circuitry 612 and rate matched using the rate matching circuitry 614 to fit the DCI into the scheduled resources.

The rate-matched payload bits of the DCI may then be scrambled by the scrambling circuitry 616 using a scrambling sequence initialized by a data scrambling seed based on the physical cell identity (PCI) of the cell or by a UE-specific cell RNTI (C-RNTI). For example, the CCH payload may be XOR'ed with the associated data scrambling sequence. The scrambled DCI bit sequence is then Quadrature Phase Shift Keying (QPSK) modulated by the QPSK modulation circuitry 618 and the resulting complex modulation symbols are mapped to physical resources (e.g., CCEs within a CORESET) by the RE mapping circuitry 620. For example, once the REGs corresponding to a PDCCH are determined, the RE mapping circuitry 620 can map the modulated symbols of the PDCCH to the REs of the determined REGs in the frequency domain first and the time domain second (e.g., in increasing order of the RE index and symbol index, respectively).

Once the symbols are mapped to REs, a fast Fourier Transform (FFT) and precoding can be applied to the DCI by the precoding circuitry 622. The precoding circuitry 622 may apply either wideband or narrowband precoding. In wideband precoding, PDCCH DMRSs are transmitted in all contiguous REGs of a CORESET carrying the PDCCH using the same precoder. In narrowband precoding, PDCCH DMRSs are transmitted only in the REG bundles actually used for the PDCCH transmission, and precoding is constant only within the REG bundle. PDCCH DMRSs may be pseudo-randomly generated using a DMRS scrambling seed that is common to all UEs in common search spaces and may be common to all UEs (e.g., if Nip, Nip are not configured; where these parameters are derived from the PSS/SSS sequences used for initial attachment and can be overridden by RRC configuration) in UE-specific search spaces. In either wideband or narrowband precoding, the same precoding is applied to the PDCCH payload and the corresponding DMRS. As such, precoding is transparent to the UE. The output of the precoding circuitry 622 corresponds to a physical downlink control channel (PDCCH) 624 carrying the DCI.

As indicated above, at the UE-side, the UE performs blind decoding for a set of PDCCH candidates (also referred to herein as CCH candidates) within one or more search space (SS) sets. As further indicated above, there are two SS set types: common SS (CSS) set, which is commonly monitored by a group of UEs in the cell, and UE-specific SS (USS) set, which is monitored by an individual UE. A UE can be configured with up to 10 SS sets each for up to four BWPs in a serving cell. Therefore, a UE can be configured with up to 40 SS sets, where each has an index of 0-39.

Monitoring a large number of PDCCH candidates or CCEs increases the UE complexity. In addition, blind decoders typically consume a significant amount of power, especially when the UE is in connected mode (e.g., RRC-Connected mode), but is not active (e.g., has no scheduled data in a slot). For example, UEs in connected mode must finish blind decoding the PDCCH candidates to ensure there is no PDCCH/PDSCH for the UE in the slot before entering a microsleep mode (e.g., turning off power to the receiver). Blind decoders may also impact the end-to-end receive time since the entire blind decoder PDCCH candidate list in the search space(s) for the UE is performed.

Therefore, PDCCH candidate pruning mechanisms may be employed to identify non-allocated CCH candidates, thus reducing the number of blind decode attempts. PDCCH candidate pruning mechanisms typically rely on estimating the probability that a received PDCCH candidate, with a certain signal quality/capacity/code rate may be successfully decoded. Examples of PDCCH pruning mechanisms include signal-to-noise ratio (SNR)-based CCH candidate pruning and mutual information (MI)-based CCH candidate pruning. In MI-based CCH candidate pruning, the UE may generate log likelihood ratios (LLRs) for the each of the CCH candidates and calculate the MI based on the LLRs. The UE may then compare the MI with a threshold for pruning. For example, for a given candidate payload size of K, transmitted over E bits, and encoded over N bits, the threshold may be calculated as:

$$TH = \frac{K_{Information}}{E - N_{Repetition} + N_{Puncture} + N_{Shortening}} = \frac{K}{N} \quad \text{(Equation 1)}$$

For calculation simplification, the division by N can be skipped, thus the threshold (TH) may be equal to the payload size K. If the MI of a particular CCH candidate falls below the threshold (TH), the CCH candidate may be pruned, thus avoiding decoding of that particular CCH candidate.

In SNR-based CCH candidate pruning, the UE may calculate the SNR of each PDCCH candidate using the DMRS of that PDCCH candidate. The UE may then compare the calculated SNR with a threshold for pruning. As with the MI threshold, the SNR threshold may be calculated based on the CCH candidate's payload size K, number of bits E over with the payload is transmitted, the encoder size N, and other suitable parameters, such as interference estimation. If the SNR of a particular CCH candidate falls below the threshold (TH), the CCH candidate may be pruned, thus avoiding decoding of that particular CCH candidate.

However, since SNR-based CCH candidate pruning uses the DMRS for signal quality estimation and thresholding. SNR-based CCH candidate pruning may not prune CCH candidates destined for other UEs that use the same DMRS scrambling sequence seed. For example, the same DMRS scrambling sequence seed may be used in common CORESETs or in overlapped UE-specific CORESETs that use the cell ID for the DMRS scrambling sequence seed.

In addition, for MI-based CCH candidate pruning mechanisms, the absolute magnitude of the LLRs generated for the scrambled CCH payload (data) is agnostic to the data scrambling sequence (e.g., since the descrambling operation is an XOR, the LLR absolute magnitude does not change based on the data scrambling sequence). Therefore, MI (LLR)-based CCH candidate pruning mechanisms may not prune CCH candidates destined for other UEs that use the same DMRS scrambling sequence seed. For example, in NR wireless communication systems that employ a common DMRS in a search space, the precoding is transparent to the UE (e.g., the DMRS, data (control information), and pilots share the same precoding). Therefore, the UE does not need to be aware of the particular precoding applied to a received PDCCH. In this case, there is no differentiation in the mutual information between PDCCHs having the same DMRS scrambling seed, and as such, the PDCCH candidates cannot be pruned based on the mutual information.

Various aspects are directed to techniques for MI-based CCH candidate pruning in CORESETs or search spaces in which the same DMRS scrambling seed is used for a plurality of UEs. In some examples, MI-based CCH candidate pruning may be enabled using a UE-specific CCH payload (data) non-transparent precoding parameter. The non-transparent precoding parameter may be configured for the UE as part of a search space configuration (e.g., via a radio resource control (RRC) configuration of the search space for the UE). Examples of non-transparent precoding parameters may include, but are not limited to, rotation, cyclic shift, and/or precoder (e.g., which may be based on a precoder table).

Figure 7:
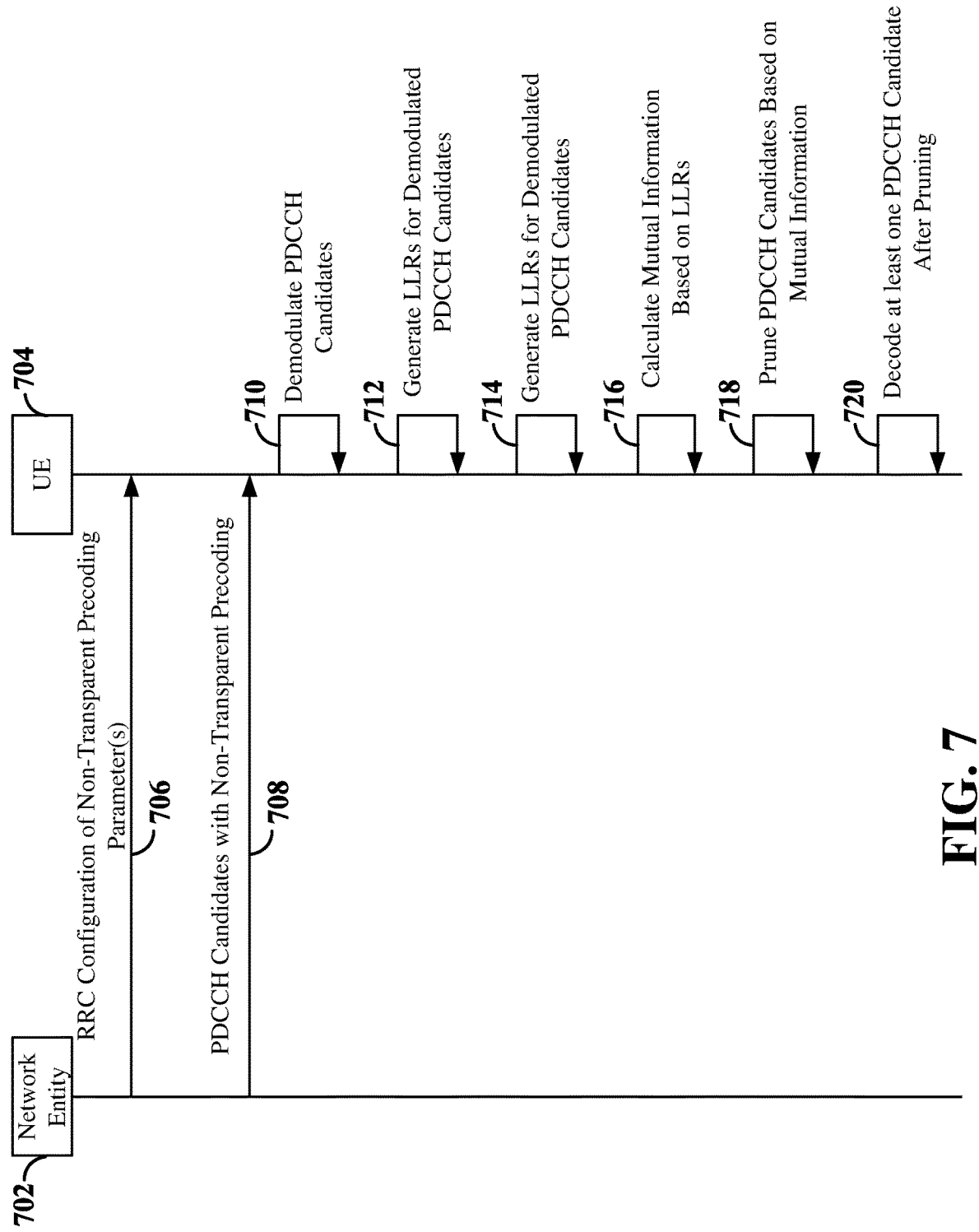
FIG. 7 is a signaling diagram illustrating exemplary signaling for mutual information (MI)-based control channel (CCH) pruning based on a non-transparent precoding parameter according to some aspects.

FIG. 7 is a signaling diagram illustrating exemplary signaling between a network entity 702 and a UE 704 for mutual information (MI)-based control channel (CCH) pruning based on a non-transparent precoding parameter according to some aspects. The network entity 702 may correspond to any of the base stations or other network entities shown in FIGS. 1, 2, and/or 6. For example, the network entity 702 may correspond to an aggregated base station, an RU, a DU, a CU, an IAB node or other network device. The UE 704 may correspond to any of the UEs shown in FIG. 1.

At 706, the network entity 702 may transmit a configuration of one or more non-transparent precoding parameters to the UE 704. Here, a non-transparent precoding parameter refers to a precoding parameter that is applicable to CCH data (payload) and that is different than the precoding parameter applied to the DMRS of a CCH. For example, the network entity 702 may transmit an RRC configuration of a search space including the non-transparent precoding parameter to be used by the network entity 702 in that search space to the UE 704. The non-transparent precoding parameter may include a constellation rotation (e.g., QPSK rotation) to be applied to the data (payload) of the control channel (e.g., to the DCI of the PDCCH), a cyclic shift to be applied to the data (payload) of the PDCCH, and/or a precoder to be applied to the data (payload) of the CCH. For example, a table including a plurality of (or list of) precoders may be defined and the RRC configuration for the search space may indicate a particular precoder in the table for CCH transmissions to the UE 704. In some examples, the table may be a unicast precoder table that is used for either unicast or broadcast PDCCH transmissions for the UE in a particular search space (e.g., either a common search space or a UE-specific search space in which a common DMRS is used).

At 708, the network entity 702 may transmit a plurality of PDCCH candidates in a search space of a slot. Each of the plurality of PDCCH candidates may be transmitted with non-transparent precoding applicable to a respective UE. In addition, each of the plurality of PDCCH candidates may include a respective DMRS having a common scrambling seed among the plurality of PDCCH candidates.

At 710, the UE 704 may demodulate the plurality of PDCCH candidates based on the non-transparent precoding parameter for the UE 704. For example, the UE 704 may demodulate each of the plurality of PDCCH candidates based on a de-rotation value corresponding to the non-transparent precoding parameter. As another example, the UE 704 may demodulate each of the plurality of PDCCH candidates based on an expected cyclic shift corresponding to the non-transparent precoding parameter. As yet another example, the UE 704 may demodulate each of the plurality of PDCCH candidates based on an expected precoder corresponding to the non-transparent precoding parameter.

At 712, the UE 704 may generate log-likelihood ratio (LLR) magnitudes for each of the plurality of demodulated PDCCH candidates. In addition, at 714, the UE 704 may calculate mutual information for each of the plurality of demodulated PDCCH candidates based on the LLR magnitudes.

At 716, the UE 704 may prune the plurality of demodulated PDCCH candidates based on the mutual information. For example, if a PDCCH candidate is demodulated with the incorrect data rotation, the calculated mutual information for that PDCCH candidate may be low. The UE 704 may compare the calculated mutual information with a threshold (e.g., such as the threshold given in Equation 1). If the calculated mutual information for a particular demodulated PDCCH candidate is less than the threshold, the UE 704 may prune that particular demodulated PDCCH candidate from the list of received PDCCH candidates. However, if the calculated mutual information for a particular PDCCH candidate is greater than or equal to the threshold, the UE 704 may continue at 720 to decode the PDDCH candidate to determine whether the PDCCH candidate is intended for the UE 704.

Figure 8:
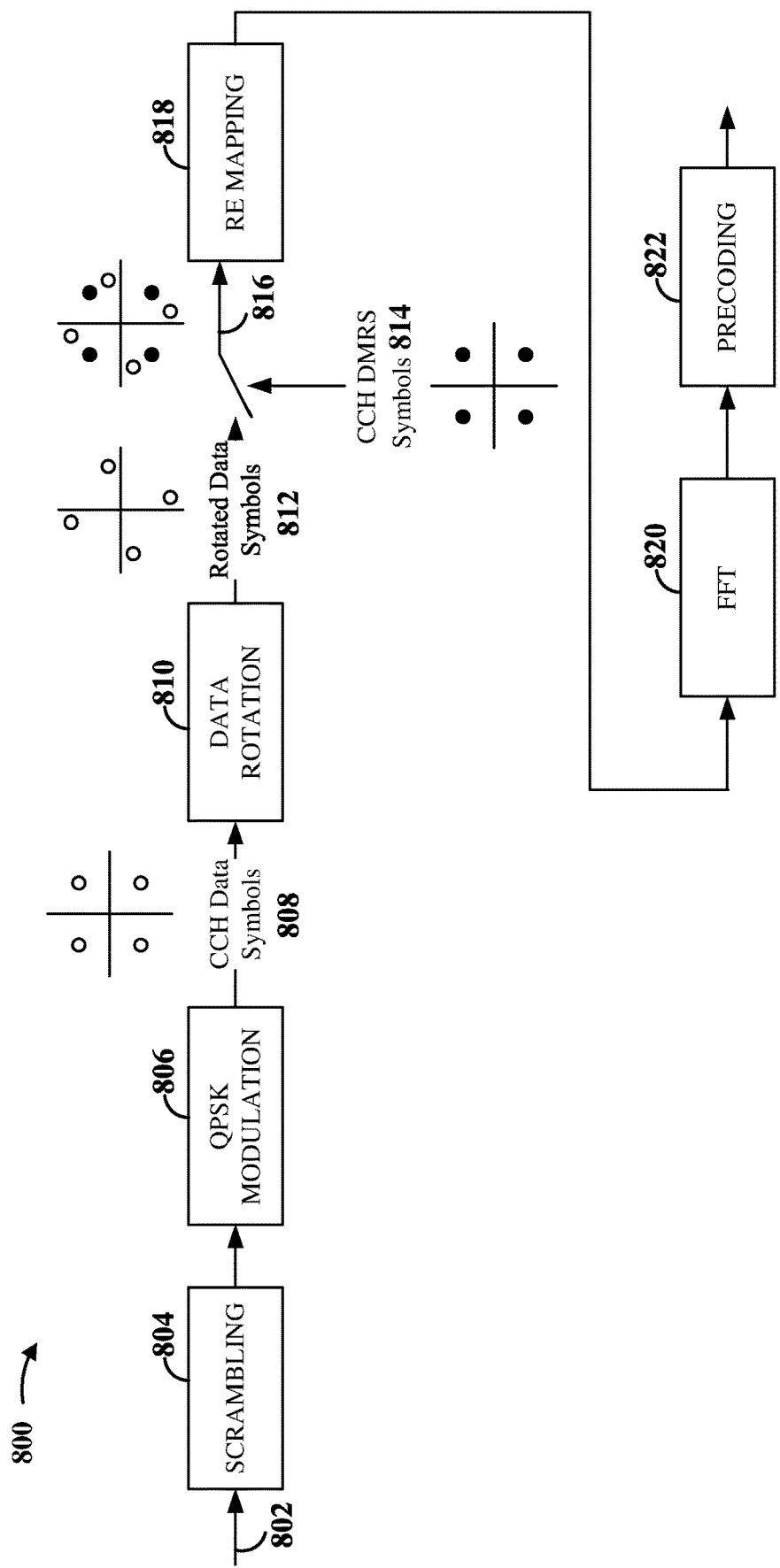
FIG. 8 is a diagram illustrating an example of PDCCH generation circuitry for applying a non-transparent precoding parameter according to some aspects.

FIG. 8 is a diagram illustrating an example of PDCCH generation circuitry 800 (e.g., within a network entity) for applying a non-transparent precoding parameter according to some aspects. The PDCCH generation circuitry 800 may include, for example, scrambling circuitry 804, QPSK modulation circuitry 806, data rotation circuitry 810, resource element (RE) mapping circuitry 818, FFT circuitry 820, and precoding circuitry 822. In some examples, the scrambling circuitry 804 may correspond to the scrambling circuitry 616 shown in FIG. 6. Thus, the scrambling circuitry 804 may be configured to receive rate-matched payload bits of DCI and to scramble the rate-matched payload bits using a scrambling sequence initialized by a data scrambling seed based on the physical cell identity (PCI) of the cell or by a UE-specific cell RNTI (C-RNTI). For example, the CCH payload may be XOR'ed with the associated data scrambling sequence.

The scrambled DCI bit sequence is then Quadrature Phase Shift Keying (QPSK) modulated by the QPSK modulation circuitry 806. The resulting complex CCH data symbols 808 are then input to the data rotation circuitry 810, which applies a constellation rotation to the CCH data symbols 808 in accordance with a non-transparent precoding parameter applicable to the UE in the search space. The data rotation circuitry 810 rotates the data by a data rotation amount (e.g., 30 degrees) in the constellation, such that the resulting rotated data symbols 812 are rotated with respect to CCH DMRS symbols 814. The rotated data symbols 812 and CCH DMRS symbols 814 are combined and input to the RE mapping circuitry 818 for mapping of the symbols to physical resources (e.g., CCEs within a CORESET). Once the symbols are mapped to REs, a fast Fourier Transform (FFT) and precoding can be applied to the DCI by the FFT circuitry 820 and precoding circuitry 822.

Figure 9:
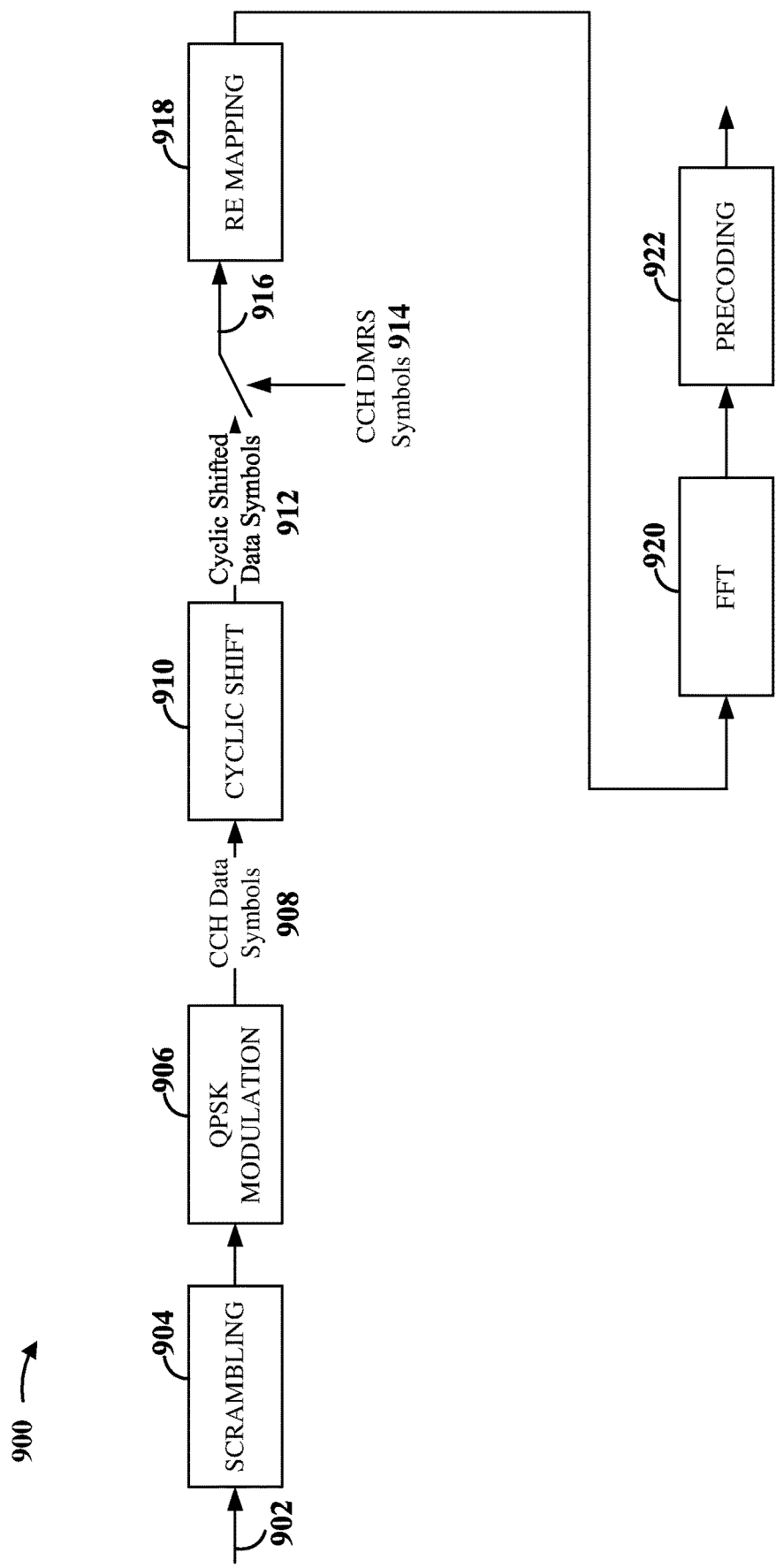
FIG. 9 is a diagram illustrating another example of PDCCH generation circuitry for applying a non-transparent precoding parameter according to some aspects.

FIG. 9 is a diagram illustrating another example of PDCCH generation circuitry 900 (e.g., within a network entity) for applying a non-transparent precoding parameter according to some aspects. The PDCCH generation circuitry 900 may include, for example, scrambling circuitry 904, QPSK modulation circuitry 906, cyclic shift circuitry 910, resource element (RE) mapping circuitry 918, FFT circuitry 920, and precoding circuitry 922. In some examples, the scrambling circuitry 904 may correspond to the scrambling circuitry 616 shown in FIG. 6. Thus, the scrambling circuitry 904 may be configured to receive rate-matched payload bits of DCI and to scramble the rate-matched payload bits using a scrambling sequence initialized by a data scrambling seed based on the physical cell identity (PCI) of the cell or by a UE-specific cell RNTI (C-RNTI). For example, the CCH payload may be XOR'ed with the associated data scrambling sequence.

The scrambled DCI bit sequence is then Quadrature Phase Shift Keying (QPSK) modulated by the QPSK modulation circuitry 906. The resulting complex CCH data symbols 908 are then input to the cyclic shift circuitry 910, which applies a cyclic shift to the CCH data symbols 908 in accordance with a non-transparent precoding parameter applicable to the UE in the search space. For example, precoding with a cyclic shift may be applied based on the following precoding matrix:

$$\begin{bmatrix} y^{(0)}(i) \\ \vdots \\ y^{(P-1)}(i) \end{bmatrix} = W(i)D(i)U \begin{bmatrix} x^{(0)}(i) \\ \vdots \\ x^{(v-1)}(i) \end{bmatrix} \quad \text{(Equation 2)}$$

where W(i) is a channel matrix used to distribute the signal to each of the physical antennas, D(i) is a matrix that applies a phase shift (e.g., cyclic shift) to the signal, and U is a matrix used to distribute the energy among each of the layers. The matrix D(i) has all zero values except on the diagonal line to perform the phase shift. In addition, D(i) changes per resource element (RE) in frequency to generate the cyclic shift precoding.

In an example, the cyclic shift circuitry 910 may apply a rotation to the CCH data symbols 908 that increases as a function of RE frequency (e.g., a Δ rotation may be added with each consecutive RE). For example, zero rotation may be applied to the first RE, a rotation of thirty degrees may be applied to the second RE, a rotation of 60 degrees may be applied to the third RE, and so on. The resulting cyclic shifted data symbols 912 are cyclic shifted with respect to (or have a different cyclic shift than) CCH DMRS symbols 914. The cyclic shifted data symbols 912 and CCH DMRS symbols 914 are combined and input to the RE mapping circuitry 918 for mapping of the symbols to physical resources (e.g., CCEs within a CORESET). Once the symbols are mapped to REs, a fast Fourier Transform (FFT) and precoding can be applied to the DCI by the FFT circuitry 920 and precoding circuitry 922.

Figure 10:
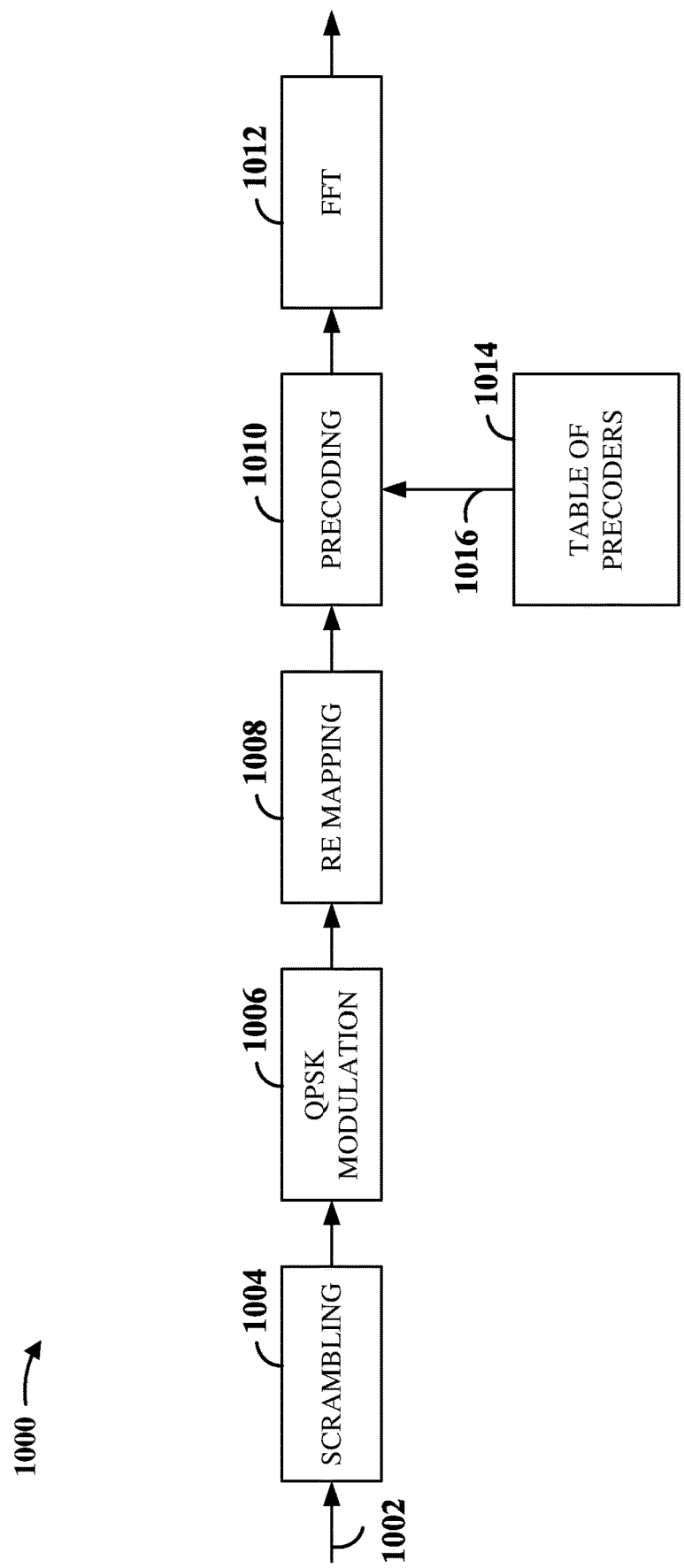
FIG. 10 is a diagram illustrating another example of PDCCH generation circuitry for applying a non-transparent precoding parameter according to some aspects.

FIG. 10 is a diagram illustrating another example of PDCCH generation circuitry 1000 (e.g., within a network entity) for applying a non-transparent precoding parameter according to some aspects. The PDCCH generation circuitry 1000 may include, for example, scrambling circuitry 1004, QPSK modulation circuitry 1006, resource element (RE) mapping circuitry 1008, precoding circuitry 1010, and FFT circuitry 1012. In some examples, the scrambling circuitry 1004 may correspond to the scrambling circuitry 616 shown in FIG. 6. Thus, the scrambling circuitry 1004 may be configured to receive rate-matched payload bits of DCI and to scramble the rate-matched payload bits using a scrambling sequence initialized by a data scrambling seed based on the physical cell identity (PCI) of the cell or by a UE-specific cell RNTI (C-RNTI). For example, the CCH payload may be XOR'ed with the associated data scrambling sequence.

The scrambled DCI bit sequence is then Quadrature Phase Shift Keying (QPSK) modulated by the QPSK modulation circuitry 1006. The resulting complex CCH data symbols are then input to the RE mapping circuitry 1008 for mapping of the symbols to physical resources (e.g., CCEs within a CORESET). Once the symbols are mapped to REs, the symbols may be input to the precoding circuitry 1010. In various aspects, the precoding circuitry 1010 may be configured to access a table of precoders 1014 and select a precoder 1016 to be applied to the DCI in accordance to a non-transparent precoding parameter applicable to the UE in the search space. The selected precoder 1016 for the DCI may be different than the precoding applied to the DMRS, and as such, non-transparent to the UE. In addition, the precoder 1016 may be different than other precoders applied to other DCI in the search space that are associated with other UEs. After precoding, a fast Fourier Transform (FFT) can be applied to the DCI by the FFT circuitry 1012.

Figure 11:
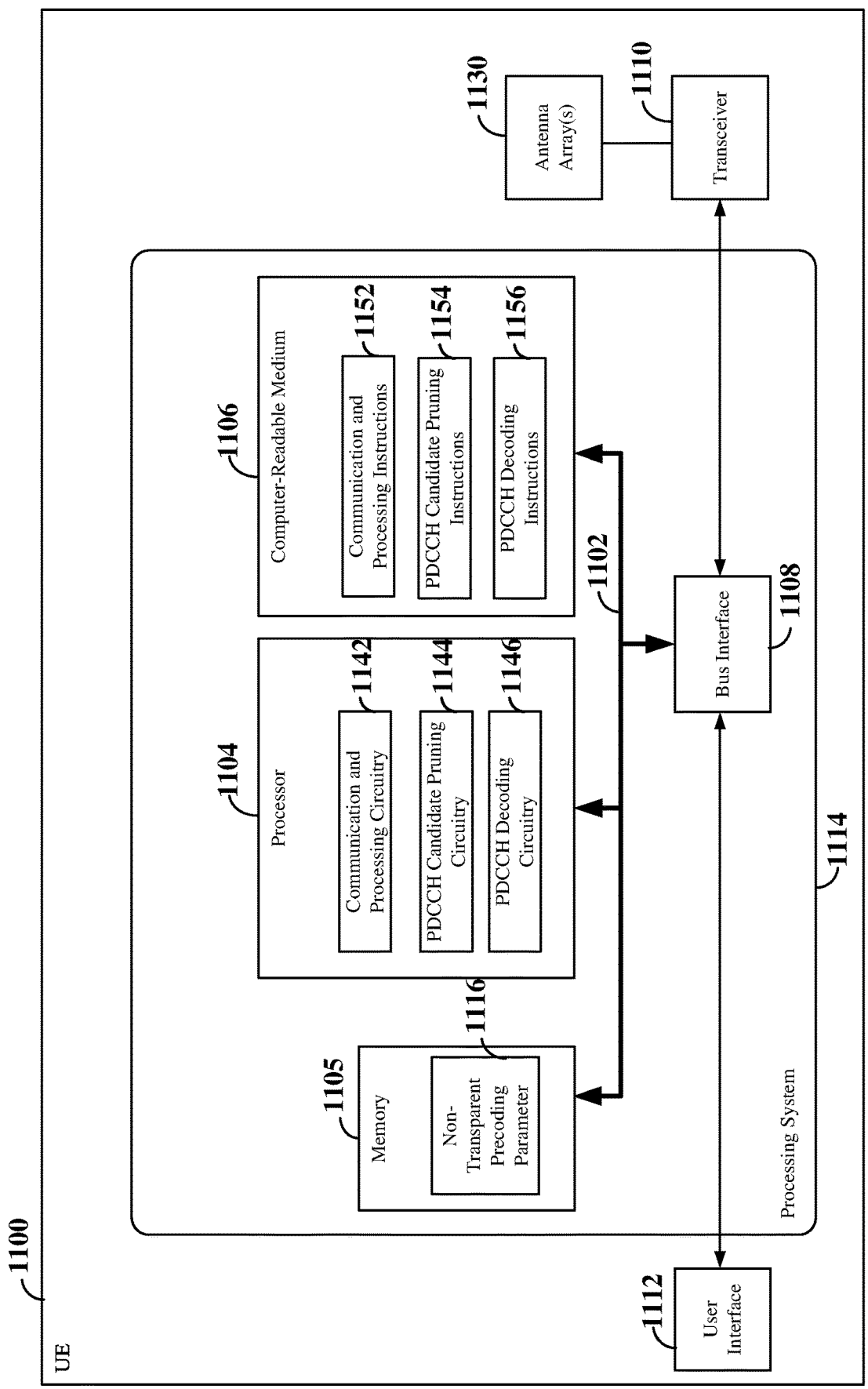
FIG. 11 is a block diagram illustrating an example of a hardware implementation for a UE employing a processing system according to some aspects.

FIG. 11 is a block diagram illustrating an example of a hardware implementation of a user equipment (UE) 1100 employing a processing system 1114 according to some aspects. For example, the UE 1100 may correspond to any of the UEs or other scheduled entities shown and described above in reference to FIGS. 1, 2, and/or 7.

In accordance with various aspects of the disclosure, an element, or any portion of an element, or any combination of elements may be implemented with a processing system 1114 that includes one or more processors, such as processor 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1100 may be configured to perform any one or more of the functions described herein. That is, the processor 1104, as utilized in the UE 1100, may be used to implement any one or more of the methods or processes described and illustrated, for example, in FIGS. 7 and/or 12.

The processor 1104 may in some instances be implemented via a baseband or modem chip and in other implementations, the processor 1104 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits, including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, are not described any further.

A bus interface 1108 provides an interface between the bus 1102, a transceiver 1110, and one or more antenna arrays 1130 (e.g., one or more antenna panels). The transceiver 1110 may be, for example, a wireless transceiver. The transceiver 1110 provides a means for communicating with various other apparatus over a transmission medium (e.g., air interface). The transceiver 1110 may further be coupled to the antenna array(s) for beamforming. The bus interface 1108 further provides an interface between the bus 1102 and a user interface 1112 (e.g., keypad, display, touch screen, speaker, microphone, control features, etc.). Of course, such a user interface 1112 may be omitted in some examples.

The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. By way of example, a computer program product may include a computer-readable medium in packaging materials. In some examples, the computer-readable medium 1106 may be part of the memory 1105. Those skilled in the art will recognize how best to implement the described functionality presented throughout this disclosure depending on the particular application and the overall design constraints imposed on the overall system. In some examples, the computer-readable medium 1106 may be implemented on an article of manufacture, which may further include one or more other elements or circuits, such as the processor 1104 and/or memory 1105.

The computer-readable medium 1106 may store computer-executable code (e.g., software). Software shall be construed broadly to mean instructions, instruction sets, code, code segments, program code, programs, subprograms, software modules, applications, software applications, software packages, routines, subroutines, objects, executables, threads of execution, procedures/processes, functions, etc., whether referred to as software, firmware, middleware, microcode, hardware description language, or otherwise.

One or more processors, such as processor 1104, may be responsible for managing the bus 1102 and general processing, including the execution of the software (e.g., instructions or computer-executable code) stored on the computer-readable medium 1106. The software, when executed by the processor 1104, causes the processing system 1114 to perform the various processes and functions described herein for any particular apparatus. The computer-readable medium 1106 and/or the memory 1105 may also be used for storing data that may be manipulated by the processor 1104 when executing software. For example, the memory 1105 may store one or more non-transparent precoding parameters 1116.

In some aspects of the disclosure, the processor 1104 may include circuitry configured for various functions. For example, the processor 1104 may include communication and processing circuitry 1142 configured to communicate with one or more UEs and/or one or more network entities. In some examples, the communication and processing circuitry 1142 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1142 may include one or more transmit/receive chains. The communication and processing circuitry 1142 may further be configured to execute communication and processing software 1152 stored on the computer-readable medium 1106 to implement one or more functions described herein.

In some implementations where the communication involves receiving information, the communication and processing circuitry 1142 may obtain information from a component of the UE 1100 (e.g., from the transceiver 1110 that receives the information via radio frequency signaling or some other type of signaling suitable for the applicable communication medium), process (e.g., decode) the information, and output the processed information. For example, the communication and processing circuitry 1142 may output the information to another component of the processor 1104, to the memory 1105, or to the bus interface 1108. In some examples, the communication and processing circuitry 1142 may receive one or more of signals, messages, other information, or any combination thereof. In some examples, the communication and processing circuitry 1142 may receive information via one or more channels. In some examples, the communication and processing circuitry 1142 may include functionality for a means for receiving. In some examples, the communication and processing circuitry 1142 may include functionality for a means for processing, including a means for demodulating, a means for decoding, etc.

In some implementations where the communication involves sending (e.g., transmitting) information, the communication and processing circuitry 1142 may obtain information (e.g., from another component of the processor 1104, the memory 1105, or the bus interface 1108), process (e.g., modulate, encode, etc.) the information, and output the processed information. For example, the communication and processing circuitry 1142 may output the information to the transceiver 1110 (e.g., that transmits the information via radio frequency signaling or some other type of signaling suitable for the applicable communication medium). In some examples, the communication and processing circuitry 1142 may send one or more of signals, messages, other information, or any combination thereof. In some examples, the communication and processing circuitry 1142 may send information via one or more channels. In some examples, the communication and processing circuitry 1142 may include functionality for a means for sending (e.g., a means for transmitting). In some examples, the communication and processing circuitry 1142 may include functionality for a means for generating, including a means for modulating, a means for encoding, etc.

The communication and processing circuitry 1142 may further be configured to receive, from a network entity, a plurality of physical downlink control channel (PDCCH) candidates. Each of the plurality of PDCCH candidates can include a respective demodulation reference signal (DMRS) and respective control information. Each of the respective DMRSs can be generated based on a scrambling seed common to a plurality of UEs including the UE in a search space. In addition, each of the respective control information can be generated based on a respective non-transparent precoding parameter 1116 associated with a respective UE of the plurality of UEs. In some examples, the non-transparent precoding parameter 1116 includes a rotation applied to the control information with respect to the DMRS. In some examples, the non-transparent precoding parameter 1116 includes a first cyclic shift applied to the control information different than a second cyclic shift applied to the DMRS. In some examples, the non-transparent precoding parameter 1116 includes a first precoder applied to the control information that is different than a second precoder applied to the DMRS. In some examples, the search space is a common search space or a UE-specific search space.

The communication and processing circuitry 1142 may further be configured to receive, from the network entity, a configuration of the respective non-transparent precoding parameter 1116 associated with the UE for the search space and to store the non-transparent precoding parameter 1116 within, for example, memory 1105. For example, the communication and processing circuitry 1142 may be configured to receive a radio resource control (RRC) configuration. The communication and processing circuitry 1142 may further be configured to execute communication and processing instructions (software) 1152 stored on the computer-readable medium 1106 to implement one or more of the functions described here.

The processor 1104 may further include PDCCH candidate pruning circuitry 1144, configured to prune the plurality of PDCCH candidates. The PDCCH candidate pruning circuitry 1144 may be configured to demodulate the plurality of PDCCH candidates to produce a plurality of demodulated PDCCH candidates. In addition, the PDCCH candidate pruning circuitry 1144 may be configured to generate log-likelihood ratio (LLR) magnitudes for each of the plurality of demodulated PDCCH candidates and calculate mutual information for each of the plurality of demodulated PDCCH candidates based on the LLR magnitudes. The PDCCH candidate pruning circuitry 1144 may further be configured to prune the plurality of demodulated PDCCH candidates based on the mutual information to identify at least one demodulated PDCCH candidate of the plurality of demodulated PDCCH candidates for decoding.

In some examples, the PDCCH candidate pruning circuitry 1144 may be configured to compare the respective mutual information associated with each of the plurality of demodulated PDCCH candidates to a threshold. The PDCCH candidate pruning circuitry 1144 may further be configured to prune select demodulated PDCCH candidates of the plurality of PDCCH candidates for which the respective mutual information is less than the threshold. The PDCCH candidate pruning circuitry 1144 may further be configured to execute PDCCH candidate pruning instructions (software) 1154 stored on the computer-readable medium 1106 to implement one or more functions described herein.

The processor 1104 may further include PDCCH decoding circuitry 1146, configured to decode the at least one demodulated PDCCH candidate remaining after pruning. The PDCCH decoding circuitry 1146 may further be configured to execute PDCCH decoding instructions (software) 1156 stored on the computer-readable medium 1106 to implement one or more functions described herein.

Figure 12:
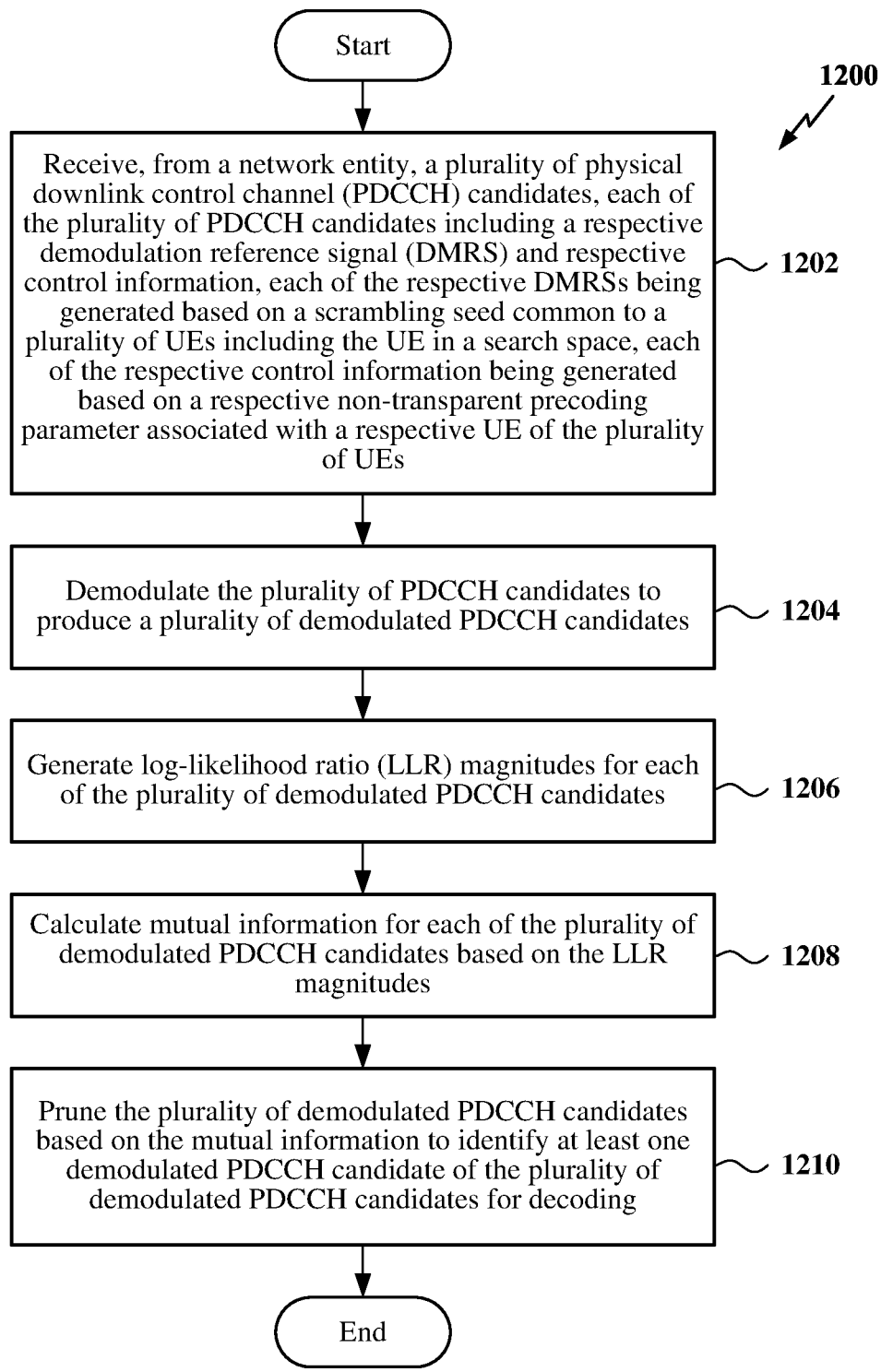
FIG. 12 is a flow chart of an exemplary process for mutual information (MI)-based PDCCH candidate pruning according to some aspects.

FIG. 12 is a flow chart illustrating an exemplary process 1200 for mutual information (MI)-based PDCCH candidate pruning according to some aspects. As described below, some or all illustrated features may be omitted in a particular implementation within the scope of the present disclosure, and some illustrated features may not be required for implementation of all embodiments. In some examples, the process 1200 may be carried out by the UE 1100 illustrated in FIG. 11. In some examples, the process 1200 may be carried out by any suitable apparatus or means for carrying out the functions or algorithm described below.

At block 1202, the UE may receive, from a network entity, a plurality of physical downlink control channel (PDCCH) candidates. Each of the plurality of PDCCH candidates can include a respective demodulation reference signal (DMRS) and respective control information. Each of the respective DMRSs can be generated based on a scrambling seed common to a plurality of UEs including the UE in a search space. In addition, each of the respective control information can be generated based on a respective non-transparent precoding parameter associated with a respective UE of the plurality of UEs.

In some examples, the non-transparent precoding parameter includes a rotation applied to the control information with respect to the DMRS. In some examples, the non-transparent precoding parameter includes a first cyclic shift applied to the control information different than a second cyclic shift applied to the DMRS. In some examples, the non-transparent precoding parameter includes a first precoder applied to the control information that is different than a second precoder applied to the DMRS. In some examples, the search space is a common search space or a UE-specific search space.

In some examples, the UE may further receive, from the network entity, a configuration of the respective non-transparent precoding parameter associated with the UE for the search space. For example, the UE may receive a radio resource control (RRC) configuration For example, the communication and processing circuitry 1142 together with the transceiver 1110 and antenna array(s) 1130, shown and described above in connection with FIG. 11 may provide a means to receive the plurality of PDCCH candidates.

At block 1204, the UE may demodulate the plurality of PDCCH candidates to produce a plurality of demodulated PDCCH candidates. For example, the PDCCH candidate pruning circuitry 1144 shown and described above in connection with FIG. 11 may provide a means to demodulate the plurality of PDCCH candidates.

At block 1206, the UE may generate log-likelihood ratio (LLR) magnitudes for each of the plurality of demodulated PDCCH candidates. For example, the PDCCH candidate pruning circuitry 1144 shown and described above in connection with FIG. 11 may provide a means to generate the LLRs.

At block 1208, the UE may calculate mutual information for each of the plurality of demodulated PDCCH candidates based on the LLR magnitudes. For example, the PDCCH candidate pruning circuitry 1144 shown and described above in connection with FIG. 11 may provide a means to calculate the mutual information.

At block 1210, the UE may prune the plurality of demodulated PDCCH candidates based on the mutual information to identify at least one demodulated PDCCH candidate of the plurality of demodulated PDCCH candidates for decoding. For example, the PDCCH candidate pruning circuitry 1144 shown and described above in connection with FIG. 11 may provide a means to prune the plurality of demodulated PDCCH candidates.

In one configuration, the UE includes means for receiving, from a network entity, a plurality of physical downlink control channel (PDCCH) candidates, each of the plurality of PDCCH candidates including a respective demodulation reference signal (DMRS) and respective control information, each of the respective DMRSs being generated based on a scrambling seed common to a plurality of UEs including the UE in a search space, each of the respective control information being generated based on a respective non-transparent precoding parameter associated with a respective UE of the plurality of UEs. The UE further includes means for demodulating the plurality of PDCCH candidates to produce a plurality of demodulated PDCCH candidates, means for generating log-likelihood ratio (LLR) magnitudes for each of the plurality of demodulated PDCCH candidates, means for calculating mutual information for each of the plurality of demodulated PDCCH candidates based on the LLR magnitudes, and means for pruning the plurality of demodulated PDCCH candidates based on the mutual information to identify at least one demodulated PDCCH candidate of the plurality of demodulated PDCCH candidates for decoding. In one aspect, the aforementioned means may be the processor 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIGS. 1, 2, and/or 7, and utilizing, for example, the processes and/or algorithms described herein in relation to FIGS. 7 and/or 12.

Figure 13:
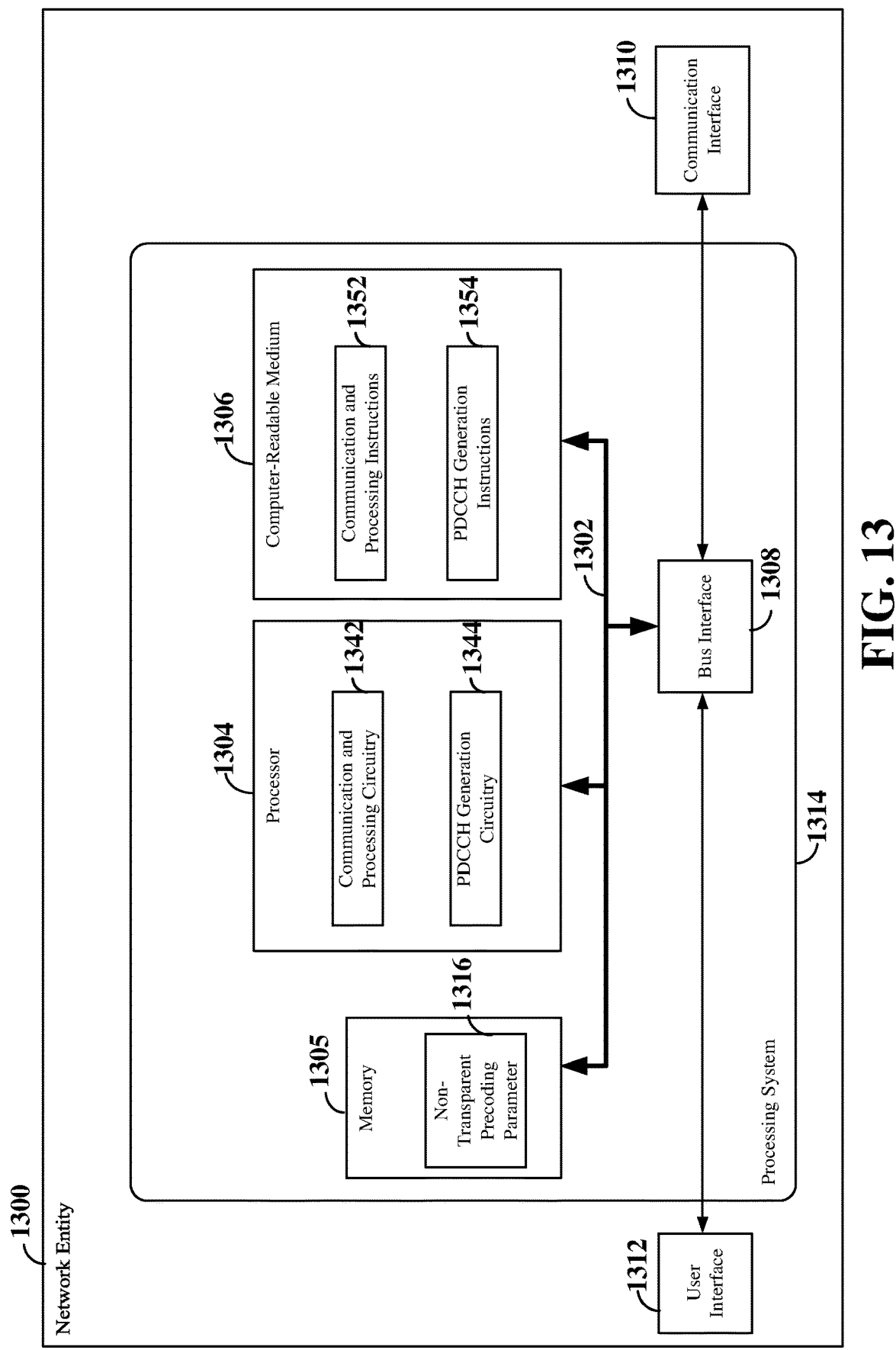
FIG. 13 is a block diagram illustrating an example of a hardware implementation for a network entity employing a processing system according to some aspects.

FIG. 13 is a block diagram illustrating an example of a hardware implementation of a network entity 1300 employing a processing system 1314 according to some aspects. The network entity 1300 may be, for example, any base station (e.g., gNB, eNB) or other scheduling entity as illustrated in any one or more of FIGS. 1, 2, and/or 9. The network entity 1300 may further be implemented in an aggregated or monolithic base station architecture, or in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. In addition, the network entity 1300 may be a stationary network entity or a mobile network entity.

In accordance with various aspects of the disclosure, an element, or any portion of an element, or any combination of elements may be implemented with a processing system 1314 that includes one or more processors, such as processor 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the network entity 1300 may be configured to perform any one or more of the functions described herein. That is, the processor 1304, as utilized in the network entity 1300, may be used to implement any one or more of the methods or processes described and illustrated, for example, in FIGS. 7 and/or 14.

The processor 1304 may in some instances be implemented via a baseband or modem chip and in other implementations, the processor 1304 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits, including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, are not described any further.

A bus interface 1308 provides an interface between the bus 1302 and a communication interface 1310. In some examples, the communication interface 1310 may include a transceiver (e.g., a wireless transceiver) and one or more antenna arrays (e.g., one or more antenna panels). The communication interface 1310 provides a means for communicating with various other apparatus over a transmission medium (e.g., air interface). The bus interface 1308 further provides an interface between the bus 1302 and a user interface 1312 (e.g., keypad, display, touch screen, speaker, microphone, control features, etc.). Of course, such a user interface 1312 may be omitted in some examples.

The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. By way of example, a computer program product may include a computer-readable medium in packaging materials. In some examples, the computer-readable medium 1306 may be part of the memory 1305. Those skilled in the art will recognize how best to implement the described functionality presented throughout this disclosure depending on the particular application and the overall design constraints imposed on the overall system. In some examples, the computer-readable medium 1306 may be implemented on an article of manufacture, which may further include one or more other elements or circuits, such as the processor 1304 and/or memory 1305.

The computer-readable medium 1306 may store computer-executable code (e.g., software). Software shall be construed broadly to mean instructions, instruction sets, code, code segments, program code, programs, subprograms, software modules, applications, software applications, software packages, routines, subroutines, objects, executables, threads of execution, procedures/processes, functions, etc., whether referred to as software, firmware, middleware, microcode, hardware description language, or otherwise.

One or more processors, such as processor 1304, may be responsible for managing the bus 1302 and general processing, including the execution of the software (e.g., instructions or computer-executable code) stored on the computer-readable medium 1306. The software, when executed by the processor 1304, causes the processing system 1314 to perform the various processes and functions described herein for any particular apparatus. The computer-readable medium 1306 and/or the memory 1305 may also be used for storing data that may be manipulated by the processor 1304 when executing software. For example, the memory 1305 may store one or more non-transparent precoding parameters 1316.

In some aspects of the disclosure, the processor 1304 may include circuitry configured for various functions. For example, the processor 1304 may include communication and processing circuitry 1342 configured to communicate with one or more UEs and/or one or more neighbor network entities. In addition, the communication and processing circuitry 1342 may be configured to communicate with a central network entity (e.g., CU, real-time or non-real-time intelligent controller or core network node) via a midhaul link and/or backhaul link. In some examples, the communication and processing circuitry 1342 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1342 may include one or more transmit/receive chains. The communication and processing circuitry 1342 may further be configured to execute communication and processing software 1352 stored on the computer-readable medium 1306 to implement one or more functions described herein.

In some implementations where the communication involves receiving information, the communication and processing circuitry 1342 may obtain information from a component of the network entity 1300 (e.g., from the communication interface 1310 that receives the information via radio frequency signaling or some other type of signaling suitable for the applicable communication medium), process (e.g., decode) the information, and output the processed information. For example, the communication and processing circuitry 1342 may output the information to another component of the processor 1304, to the memory 1305, or to the bus interface 1308. In some examples, the communication and processing circuitry 1342 may receive one or more of signals, messages, other information, or any combination thereof. In some examples, the communication and processing circuitry 1342 may receive information via one or more channels. In some examples, the communication and processing circuitry 1342 may include functionality for a means for receiving. In some examples, the communication and processing circuitry 1342 may include functionality for a means for processing, including a means for demodulating, a means for decoding, etc.

In some implementations where the communication involves sending (e.g., transmitting) information, the communication and processing circuitry 1342 may obtain information (e.g., from another component of the processor 1304, the memory 1305, or the bus interface 1308), process (e.g., modulate, encode, etc.) the information, and output the processed information. For example, the communication and processing circuitry 1342 may output the information to the communication interface 1310 (e.g., that transmits the information via radio frequency signaling or some other type of signaling suitable for the applicable communication medium). In some examples, the communication and processing circuitry 1342 may send one or more of signals, messages, other information, or any combination thereof. In some examples, the communication and processing circuitry 1342 may send information via one or more channels. In some examples, the communication and processing circuitry 1342 may include functionality for a means for sending (e.g., a means for transmitting). In some examples, the communication and processing circuitry 1342 may include functionality for a means for generating, including a means for modulating, a means for encoding, etc.

The communication and processing circuitry 1342 may further be configured to provide a plurality of physical downlink control channels (PDCCHs) in a search space to at least one of a plurality of UEs. In some examples, the search space is a common search space or a UE-specific search space. The communication and processing circuitry 1342 may further be configured to provide, to a UE of the plurality of UEs, a configuration of the respective non-transparent precoding parameter associated with the UE for the search space. For example, the configuration may include a radio resource control (RRC) configuration. The communication and processing circuitry 1342 may further be configured to execute communication and processing instructions (software) 1352 stored on the computer-readable medium 1306 to implement one or more of the functions described here.

The processor 1304 may further include PDCCH generation circuitry 1344, configured to generating a plurality of physical downlink control channels (PDCCHs). The PDCCH generation circuitry 1344 may correspond, for example, to the PDCCH generation circuitry shown in FIGS. 6, 8, 9, and/or 10. Each of the plurality of PDCCHs includes a respective demodulation reference signal (DMRS) and respective control information. In addition, each of the respective DMRSs can be generated based on a scrambling seed common to a plurality of UEs in the search space. Furthermore, each of the respective control information can generated based on a respective non-transparent precoding parameter 1316 associated with a respective UE of the plurality of UEs.

In some examples, the non-transparent precoding parameter includes a rotation applied to the control information with respect to the DRMS. In other examples, the non-transparent precoding parameter includes a first cyclic shift applied the control information different than a second cyclic shift applied the DMRS. In some examples, the non-transparent precoding parameter includes a first precoder applied to the control information that is different than a second precoder applied to the DMRS. The PDCCH generation circuitry 1344 may further be configured to execute PDCCH generation instructions (software) 1354 stored on the computer-readable medium 1306 to implement one or more functions described herein.

Figure 14:
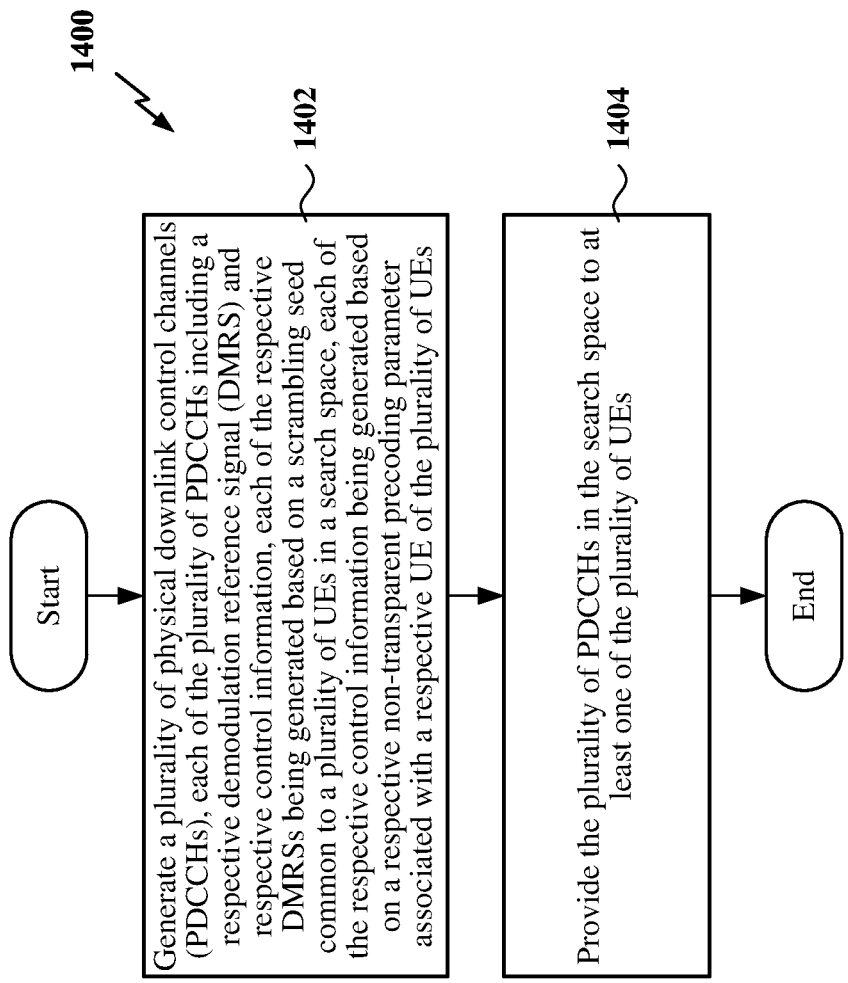
FIG. 14 is a flow chart of an exemplary process for generating PDCCHs using non-transparent precoding parameters according to some aspects.

FIG. 14 is a flow chart illustrating an exemplary process 1400 for generating PDCCHs using non-transparent precoding parameters according to some aspects. As described below, some or all illustrated features may be omitted in a particular implementation within the scope of the present disclosure, and some illustrated features may not be required for implementation of all embodiments. In some examples, the process 1400 may be carried out by the network entity 1300 illustrated in FIG. 13. In some examples, the process 1400 may be carried out by any suitable apparatus or means for carrying out the functions or algorithm described below.

At block 1402, the network entity may generate a plurality of physical downlink control channels (PDCCHs). Each of the plurality of PDCCHs includes a respective demodulation reference signal (DMRS) and respective control information. In addition, each of the respective DMRSs can be generated based on a scrambling seed common to a plurality of UEs in a search space. Furthermore, each of the respective control information can generated based on a respective non-transparent precoding parameter 1316 associated with a respective UE of the plurality of UEs. In some examples, the search space is a common search space or a UE-specific search space.

In some examples, the non-transparent precoding parameter includes a rotation applied to the control information with respect to the DRMS. In other examples, the non-transparent precoding parameter includes a first cyclic shift applied the control information different than a second cyclic shift applied the DMRS. In some examples, the non-transparent precoding parameter includes a first precoder applied to the control information that is different than a second precoder applied to the DMRS. For example, the PDCCH generation circuitry 1344 shown and described above in connection with FIG. 13 may provide a means to generate the PDCCHs.

At block 1404, the network entity may provide the plurality of PDCCHs in the search space to at least one of the plurality of UEs. In some examples, the network entity may further be configured to provide, to a UE of the plurality of UEs, a configuration of the respective non-transparent precoding parameter associated with the UE for the search space. For example, the configuration may include a radio resource control (RRC) configuration. For example, the communication and processing circuitry 1342, together with the PDCCH generation circuitry 1344 and communication interface 1310, shown and described above in connection with FIG. 13 may provide a means to provide the plurality of PDCCHs.

In one configuration, the network entity includes means for generating a plurality of physical downlink control channels (PDCCHs), each of the plurality of PDCCHs including a respective demodulation reference signal (DMRS) and respective control information, each of the respective DMRSs being generated based on a scrambling seed common to a plurality of UEs in a search space, each of the respective control information being generated based on a respective non-transparent precoding parameter associated with a respective UE of the plurality of UEs. The network entity further includes means for providing the plurality of PDCCHs in the search space to at least one of the plurality of UEs. In one aspect, the aforementioned means may be the processor 1304 shown in FIG. 13 configured to perform the functions recited by the aforementioned means. In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable storage medium 1306, or any other suitable apparatus or means described in any one of the FIGS. 1, 2, and/or 7, and utilizing, for example, the processes and/or algorithms described herein in relation to FIGS. 7 and/or 14.

The following provides an overview of aspects of the present disclosure:

Aspect 1: A method operable at a user equipment (UE), the method comprising: receiving, from a network entity, a plurality of physical downlink control channel (PDCCH) candidates, each of the plurality of PDCCH candidates comprising a respective demodulation reference signal (DMRS) and respective control information, each of the respective DMRSs being generated based on a scrambling seed common to a plurality of UEs including the UE in a search space, each of the respective control information being generated based on a respective non-transparent precoding parameter associated with a respective UE of the plurality of UEs; demodulating the plurality of PDCCH candidates to produce a plurality of demodulated PDCCH candidates; generating log-likelihood ratio (LLR) magnitudes for each of the plurality of demodulated PDCCH candidates; calculating mutual information for each of the plurality of demodulated PDCCH candidates based on the LLR magnitudes; and pruning the plurality of demodulated PDCCH candidates based on the mutual information to identify at least one demodulated PDCCH candidate of the plurality of demodulated PDCCH candidates for decoding.

Aspect 2: The method of aspect 1, wherein the pruning the plurality of demodulated PDCCH candidates comprises: comparing the respective mutual information associated with each of the plurality of demodulated PDCCH candidates to a threshold; and pruning select demodulated PDCCH candidates of the plurality of PDCCH candidates for which the respective mutual information is less than the threshold.

Aspect 3: The method of aspect 1 or 2, wherein the non-transparent precoding parameter comprises a rotation applied the control information with respect to the DMRS.

Aspect 4: The method of aspect 1 or 2, wherein the non-transparent precoding parameter comprises a first cyclic shift applied the control information different than a second cyclic shift applied the DMRS.

Aspect 5: The method of aspect 1 or 2, wherein the non-transparent precoding parameter comprises a first precoder applied to the control information that is different than a second precoder applied to the DMRS.

Aspect 6: The method of any of aspects 1 through 5, wherein the search space is a common search space.

Aspect 7: The method of any of aspects 1 through 5, wherein the search space is a UE-specific search space.

Aspect 8: The method of any of aspects 1 through 7, further comprising: receiving, from the network entity, a configuration of the respective non-transparent precoding parameter associated with the UE for the search space.

Aspect 9: The method of aspect 8, wherein the configuration comprises a radio resource control (RRC) configuration.

Aspect 10: An apparatus for wireless communication at a user equipment (UE) comprising a memory and a processor coupled to the memory, the processor being configured to perform a method of any one of aspects 1 through 9.

Aspect 11: A UE comprising at least one means for performing a method of any one of aspects 1 through 9.

Aspect 12: A non-transitory computer-readable medium having stored therein instructions executable by one or more processors of a UE to perform a method of any one of aspects 1 through 9.

Aspect 13: A method operable at a network entity, the method comprising: generating a plurality of physical downlink control channels (PDCCHs), each of the plurality of PDCCHs comprising a respective demodulation reference signal (DMRS) and respective control information, each of the respective DMRSs being generated based on a scrambling seed common to a plurality of UEs in a search space, each of the respective control information being generated based on a respective non-transparent precoding parameter associated with a respective UE of the plurality of UEs; and providing the plurality of PDCCHs in the search space to at least one of the plurality of UEs.

Aspect 14: The method of aspect 13, wherein the non-transparent precoding parameter comprises a rotation applied the control information with respect to the DMRS.

Aspect 15: The method of aspect 13, wherein the non-transparent precoding parameter comprises a first cyclic shift applied the control information different than a second cyclic shift applied the DMRS.

Aspect 16: The method of aspect 13, wherein the non-transparent precoding parameter comprises a first precoder applied to the control information that is different than a second precoder applied to the DMRS.

Aspect 17: The method of any of aspects 13 through 16, wherein the search space is a common search space.

Aspect 18: The method of any of aspects 13 through 16, wherein the search space is a UE-specific search space.

Aspect 19: The method of any of aspects 13 through 18, further comprising: providing, to a UE of the plurality of UEs, a configuration of the respective non-transparent precoding parameter associated with the UE for the search space.

Aspect 20: The method of aspect 19, wherein the configuration comprises a radio resource control (RRC) configuration.

Aspect 21: An apparatus for wireless communication at a network entity comprising a memory and a processor coupled to the memory, the processor being configured to perform a method of any one of aspects 13 through 20.

Aspect 22: A network entity comprising at least one means for performing a method of any one of aspects 13 through 20.

Aspect 23: A non-transitory computer-readable medium having stored therein instructions executable by one or more processors of a network entity to perform a method of any one of aspects 13 through 20.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the $3^{rd}$ Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 7, 11, and/or 13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. An apparatus for wireless communication at a user equipment (UE), the apparatus comprising:
   one or more memories; and
   one or more processors coupled to the one or more memories, the one or more processors being configured to cause the UE to:

receive, from a network entity, a plurality of physical downlink control channel (PDCCH) candidates, each of the plurality of PDCCH candidates comprising a respective demodulation reference signal (DMRS) and respective control information, each of the respective DMRSs being generated based on a scrambling seed common to a plurality of UEs including the UE in a search space, each of the respective control information being generated based on a respective non-transparent precoding parameter associated with a respective UE of the plurality of UEs;

demodulate the plurality of PDCCH candidates to produce a plurality of demodulated PDCCH candidates;

generate log-likelihood ratio (LLR) magnitudes for each of the plurality of demodulated PDCCH candidates;

calculate mutual information for each of the plurality of demodulated PDCCH candidates based on the LLR magnitudes; and prune the plurality of demodulated PDCCH candidates based on the mutual information to identify at least one demodulated PDCCH candidate of the plurality of demodulated PDCCH candidates for decoding.

2. The apparatus of claim 1, wherein the one or more processors are further configured to cause the UE to:

compare the respective mutual information associated with each of the plurality of demodulated PDCCH candidates to a threshold; and prune select demodulated PDCCH candidates of the plurality of PDCCH candidates for which the respective mutual information is less than the threshold.

3. The apparatus of claim 1, wherein the non-transparent precoding parameter comprises a rotation applied the control information with respect to the DMRS.

4. The apparatus of claim 1, wherein the non-transparent precoding parameter comprises a first cyclic shift applied the control information different than a second cyclic shift applied the DMRS.

5. The apparatus of claim 1, wherein the non-transparent precoding parameter comprises a first precoder applied to the control information that is different than a second precoder applied to the DMRS.

6. The apparatus of claim 1, wherein the search space is a common search space.

7. The apparatus of claim 1, wherein the search space is a UE-specific search space.

8. The apparatus of claim 1, wherein the one or more processors are further configured to cause the UE to:

receive, from the network entity, a configuration of the respective non-transparent precoding parameter associated with the UE for the search space.

9. The apparatus of claim 8, wherein the configuration comprises a radio resource control (RRC) configuration.

10. A method operable at a user equipment (UE), the method comprising:

receiving, from a network entity, a plurality of physical downlink control channel (PDCCH) candidates, each of the plurality of PDCCH candidates comprising a respective demodulation reference signal (DMRS) and respective control information, each of the respective DMRSs being generated based on a scrambling seed common to a plurality of UEs including the UE in a search space, each of the respective control information being generated based on a respective non-transparent precoding parameter associated with a respective UE of the plurality of UEs;

demodulating the plurality of PDCCH candidates to produce a plurality of demodulated PDCCH candidates;

generating log-likelihood ratio (LLR) magnitudes for each of the plurality of demodulated PDCCH candidates;

calculating mutual information for each of the plurality of demodulated PDCCH candidates based on the LLR magnitudes; and pruning the plurality of demodulated PDCCH candidates based on the mutual information to identify at least one demodulated PDCCH candidate of the plurality of demodulated PDCCH candidates for decoding.

11. The method of claim 10, wherein the pruning the plurality of demodulated PDCCH candidates comprises:

comparing the respective mutual information associated with each of the plurality of demodulated PDCCH candidates to a threshold; and pruning select demodulated PDCCH candidates of the plurality of PDCCH candidates for which the respective mutual information is less than the threshold.

12. The method of claim 10, wherein the non-transparent precoding parameter comprises a rotation applied the control information with respect to the DMRS.

13. The method of claim 10, wherein the non-transparent precoding parameter comprises a first cyclic shift applied the control information different than a second cyclic shift applied the DMRS.

14. The method of claim 10, wherein the non-transparent precoding parameter comprises a first precoder applied to the control information that is different than a second precoder applied to the DMRS.

15. The method of claim 10, wherein the search space is a common search space.

16. The method of claim 10, wherein the search space is a UE-specific search space.

17. The method of claim 10, further comprising:

receiving, from the network entity, a configuration of the respective non-transparent precoding parameter associated with the UE for the search space.

18. The method of claim 17, wherein the configuration comprises a radio resource control (RRC) configuration.

19. An apparatus for wireless communication at a network entity, the apparatus comprising:

one or more memories; and one or more processors coupled to the one or more memories, the one or more processors being configured to cause the network entity to:

generate a plurality of physical downlink control channels (PDCCHs), each of the plurality of PDCCHs comprising a respective demodulation reference signal (DMRS) and respective control information, each of the respective DMRSs being generated based on a scrambling seed common to a plurality of UEs in a search space, each of the respective control information being generated based on a respective non-transparent precoding parameter associated with a respective UE of the plurality of UEs, wherein the non-transparent precoding parameter comprises a first cyclic shift applied the control information different than a second cyclic shift applied to the DMRS; and provide the plurality of PDCCHs in the search space to at least one of the plurality of UEs.

20. The apparatus of claim 19, wherein the search space is a common search space.

21. The apparatus of claim 19, wherein the search space is a UE-specific search space.

22. The apparatus of claim 19, wherein the one or more processors are further configured to cause the network entity to:
provide, to a UE of the plurality of UEs, a configuration of the respective non-transparent precoding parameter associated with the UE for the search space.

23. The apparatus of claim 22, wherein the configuration comprises a radio resource control (RRC) configuration.

24. A method operable at a network entity, the method comprising:
generating a plurality of physical downlink control channels (PDCCHs), each of the plurality of PDCCHs comprising a respective demodulation reference signal (DMRS) and respective control information, each of the respective DMRSs being generated based on a scrambling seed common to a plurality of UEs in a search space, each of the respective control information being generated based on a respective non-transparent precoding parameter associated with a respective UE of the plurality of UEs, wherein the non-transparent precoding parameter comprises a first cyclic shift applied the control information different than a second cyclic shift applied to the DMRS; and
providing the plurality of PDCCHs in the search space to at least one of the plurality of UEs.

25. The method of claim 24, wherein the search space is a common search space.

26. The method of claim 24, wherein the search space is a UE-specific search space.

27. The method of claim 24, further comprising:
providing, to a UE of the plurality of UEs, a configuration of the respective non-transparent precoding parameter associated with the UE for the search space.

28. The method of claim 27, wherein the configuration comprises a radio resource control (RRC) configuration.

\* \* \* \* \*